US009007601B2

(12) United States Patent
Steffey et al.

(10) Patent No.: US 9,007,601 B2
(45) Date of Patent: Apr. 14, 2015

(54) AUTOMATIC MEASUREMENT OF DIMENSIONAL DATA WITH A LASER TRACKER

(71) Applicant: FARO Technologies, Inc., Lake Mary, FL (US)

(72) Inventors: Kenneth Steffey, Longwood, FL (US); Nils P. Steffensen, Kennett Square, PA (US); Robert E. Bridges, Kennett Square, PA (US)

(73) Assignee: FARO Technologies, Inc., Lake Mary, FL (US)

( * ) Notice: Subject to any disclaimer, the term of this patent is extended or adjusted under 35 U.S.C. 154(b) by 0 days.

(21) Appl. No.: 14/199,211

(22) Filed: Mar. 6, 2014

(65) Prior Publication Data

US 2014/0185059 A1   Jul. 3, 2014

Related U.S. Application Data

(60) Division of application No. 13/860,010, filed on Apr. 10, 2013, now Pat. No. 8,724,120, which is a division of application No. 13/418,899, filed on Mar. 13, 2012, now Pat. No. 8,619,265, which is a (Continued)

(51) Int. Cl.
*G01B 11/14* (2006.01)
*G01B 11/00* (2006.01)
(Continued)

(52) U.S. Cl.
CPC .............. *G01B 11/14* (2013.01); *G01B 11/002* (2013.01); *G01B 21/045* (2013.01);
(Continued)

(58) Field of Classification Search
USPC .......................................... 356/614
See application file for complete search history.

(56) References Cited

U.S. PATENT DOCUMENTS 2,612,994 A   10/1952 Woodland
2,682,804 A   7/1954 Clifford et al.
(Continued)

FOREIGN PATENT DOCUMENTS

CN   1290850 A   4/2001
CN   1362692 A   8/2002
(Continued)

OTHER PUBLICATIONS

Automated Precision, Inc., Product Specifications, Radian, Featuring INNOVO Technology, info@apisensor.com, Copyright 2011.
(Continued)

*Primary Examiner* — Tu Nguyen
(74) *Attorney, Agent, or Firm* — Cantor Colburn LLP

(57) ABSTRACT

Measuring with a system having retroreflector targets and a laser tracker includes storing a list of coordinates for three targets and at least one added point; capturing on a photosensitive array a portion of the light emitted by a light beam and reflected off the targets; obtaining spot positions on a photosensitive array of a tracker camera from the reflected light; determining a correspondence between three spot positions on the photosensitive array and the coordinates of the targets; directing a beam of light from the tracker to the targets based at least in part on the coordinates of the first target and the first spot position; measuring 3-D coordinates of the targets with the tracker; determining 3-D coordinates of the at least one added point based at least in part on the measured 3-D coordinates of the targets and the coordinates of the at least one added point.

26 Claims, 15 Drawing Sheets

Related U.S. Application Data continuation-in-part of application No. 13/340,730, filed on Dec. 30, 2011, now Pat. No. 8,537,371, which is a continuation-in-part of application No. 13/090,889, filed on Apr. 20, 2011, now Pat. No. 8,422,034, said application No. 13/418,899 is a continuation-in-part of application No. 13/407,983, filed on Feb. 29, 2012, now Pat. No. 8,467,072.

(60) Provisional application No. 61/452,314, filed on Mar. 14, 2011, provisional application No. 61/326,294, filed on Apr. 21, 2010, provisional application No. 61/475,703, filed on Apr. 15, 2011, provisional application No. 61/592,049, filed on Jan. 30, 2012, provisional application No. 61/448,823, filed on Mar. 3, 2011.

(51) Int. Cl.
| | |
|---|---|
| G01B 21/04 | (2006.01) |
| G01C 15/00 | (2006.01) |
| G01S 7/48 | (2006.01) |
| G01S 7/481 | (2006.01) |
| G01S 7/497 | (2006.01) |
| G01S 17/42 | (2006.01) |
| G01S 17/66 | (2006.01) |
| G01S 17/89 | (2006.01) |

(52) U.S. Cl.
CPC ............ *G01C 15/002* (2013.01); *G01S 7/4808* (2013.01); *G01S 7/4811* (2013.01); *G01S 7/4813* (2013.01); *G01S 7/4815* (2013.01); *G01S 7/4972* (2013.01); *G01S 17/42* (2013.01); *G01S 17/66* (2013.01); *G01S 17/89* (2013.01)

(56) References Cited

U.S. PATENT DOCUMENTS

| | | |
|---|---|---|
| 2,484,641 A | 3/1957 | Keuffel et al. |
| 2,784,641 A | 3/1957 | Keuffel et al. |
| 3,339,457 A | 9/1967 | Pun |
| 3,365,717 A | 1/1968 | Holscher |
| 3,464,770 A | 9/1969 | Schmidt |
| 3,497,695 A | 2/1970 | Smith et al. |
| 3,508,828 A | 4/1970 | Froome et al. |
| 3,619,058 A | 11/1971 | Hewlett et al. |
| 3,627,429 A | 12/1971 | Jaenicke et al. |
| 3,658,426 A | 4/1972 | Vyce |
| 3,728,025 A | 4/1973 | Madigan et al. |
| 3,740,141 A | 6/1973 | DeWitt, Jr. |
| 3,779,645 A | 12/1973 | Nakazawa et al. |
| 3,813,165 A | 5/1974 | Hines et al. |
| 3,832,056 A | 8/1974 | Shipp et al. |
| 3,900,260 A | 8/1975 | Wendt |
| 3,914,052 A | 10/1975 | Wiklund |
| 4,113,381 A | 9/1978 | Epstein |
| 4,297,030 A | 10/1981 | Chaborski |
| 4,403,857 A | 9/1983 | Holscher |
| 4,413,907 A | 11/1983 | Lane |
| 4,453,825 A | 6/1984 | Buck et al. |
| 4,498,764 A | 2/1985 | Bolkow et al. |
| 4,531,833 A | 7/1985 | Ohtomo |
| 4,537,475 A | 8/1985 | Summers et al. |
| 4,560,270 A | 12/1985 | Wiklund et al. |
| 4,632,547 A | 12/1986 | Kaplan et al. |
| 4,652,130 A | 3/1987 | Tank |
| 4,689,489 A | 8/1987 | Cole |
| 4,692,023 A | 9/1987 | Ohtomo et al. |
| 4,699,508 A | 10/1987 | Bolkow et al. |
| 4,707,129 A | 11/1987 | Hashimoto et al. |
| 4,714,339 A | 12/1987 | Lau et al. |
| 4,731,879 A | 3/1988 | Sepp et al. |
| 4,777,660 A | 10/1988 | Gould et al. |
| 4,790,651 A | 12/1988 | Brown et al. |
| 4,983,021 A | 1/1991 | Fergason |
| 5,002,388 A | 3/1991 | Ohishi et al. |
| 5,051,934 A | 9/1991 | Wiklund |
| 5,082,364 A | 1/1992 | Russell |
| 5,090,131 A | 2/1992 | Deer |
| 5,121,242 A | 6/1992 | Kennedy |
| 5,137,354 A | 8/1992 | Devos et al. |
| 5,138,154 A | 8/1992 | Hotelling |
| 5,162,862 A | 11/1992 | Bartram et al. |
| 5,267,014 A | 11/1993 | Prenninger |
| 5,313,409 A | 5/1994 | Wiklund et al. |
| 5,319,434 A | 6/1994 | Croteau et al. |
| 5,347,306 A | 9/1994 | Nitta |
| 5,392,521 A | 2/1995 | Allen |
| 5,400,130 A | 3/1995 | Tsujimoto et al. |
| 5,402,193 A | 3/1995 | Choate |
| 5,416,321 A | 5/1995 | Sebastian et al. |
| 5,440,112 A | 8/1995 | Sakimura et al. |
| 5,440,326 A | 8/1995 | Quinn |
| 5,448,505 A | 9/1995 | Novak |
| 5,455,670 A | 10/1995 | Payne et al. |
| 5,500,737 A | 3/1996 | Donaldson et al. |
| 5,532,816 A | 7/1996 | Spann et al. |
| 5,534,992 A | 7/1996 | Takeshima et al. |
| 5,594,169 A | 1/1997 | Field et al. |
| D378,751 S | 4/1997 | Smith |
| 5,671,160 A * | 9/1997 | Julian ............................ 702/94 |
| 5,698,784 A | 12/1997 | Hotelling et al. |
| 5,724,264 A | 3/1998 | Rosenberg et al. |
| 5,737,068 A | 4/1998 | Kaneko et al. |
| 5,742,379 A | 4/1998 | Reifer |
| 5,754,284 A | 5/1998 | Leblanc et al. |
| RE35,816 E | 6/1998 | Schulz |
| 5,764,360 A | 6/1998 | Meier |
| 5,767,952 A | 6/1998 | Ohtomo et al. |
| 5,771,623 A | 6/1998 | Pernstich et al. |
| 5,825,350 A | 10/1998 | Case, Jr. et al. |
| 5,828,057 A | 10/1998 | Hertzman et al. |
| 5,861,956 A | 1/1999 | Bridges et al. |
| 5,880,822 A | 3/1999 | Kubo |
| 5,886,775 A | 3/1999 | Houser et al. |
| 5,886,777 A | 3/1999 | Hirunuma |
| 5,892,575 A | 4/1999 | Marino |
| 5,898,421 A | 4/1999 | Quinn |
| 5,926,388 A | 7/1999 | Kimbrough et al. |
| 5,957,559 A | 9/1999 | Rueb et al. |
| 5,973,788 A | 10/1999 | Pettersen et al. |
| 5,991,011 A | 11/1999 | Damm |
| 6,017,125 A | 1/2000 | Vann |
| 6,023,326 A | 2/2000 | Katayama et al. |
| 6,034,722 A | 3/2000 | Viney et al. |
| 6,036,319 A | 3/2000 | Rueb et al. |
| 6,052,190 A | 4/2000 | Sekowski et al. |
| D427,087 S | 6/2000 | Kaneko et al. |
| 6,085,155 A | 7/2000 | Hayase et al. |
| 6,097,491 A | 8/2000 | Hartrumpf |
| 6,100,540 A | 8/2000 | Ducharme et al. |
| 6,111,563 A | 8/2000 | Hines |
| 6,133,998 A | 10/2000 | Monz et al. |
| 6,166,809 A | 12/2000 | Pettersen et al. |
| 6,171,018 B1 | 1/2001 | Ohtomo et al. |
| 6,193,371 B1 | 2/2001 | Snook |
| 6,222,465 B1 | 4/2001 | Kumar et al. |
| 6,262,801 B1 | 7/2001 | Shibuya et al. |
| 6,295,174 B1 | 9/2001 | Ishinabe et al. |
| 6,317,954 B1 | 11/2001 | Cunningham et al. |
| 6,324,024 B1 | 11/2001 | Shirai et al. |
| 6,330,379 B1 | 12/2001 | Hendriksen |
| 6,344,846 B1 | 2/2002 | Hines |
| 6,347,290 B1 | 2/2002 | Bartlett |
| 6,351,483 B1 | 2/2002 | Chen |
| 6,353,764 B1 | 3/2002 | Imagawa et al. |
| 6,369,794 B1 | 4/2002 | Sakurai et al. |
| 6,369,880 B1 | 4/2002 | Steinlechner |
| 6,433,866 B1 | 8/2002 | Nichols |
| 6,437,859 B1 | 8/2002 | Ohtomo et al. |
| 6,445,446 B1 | 9/2002 | Kumagai et al. |
| 6,462,810 B1 | 10/2002 | Muraoka et al. |

(56) References Cited

U.S. PATENT DOCUMENTS

| | | |
|---|---|---|
| 6,463,393 B1 | 10/2002 | Giger |
| 6,490,027 B1 | 12/2002 | Rajchel et al. |
| 6,532,060 B1 | 3/2003 | Kindaichi et al. |
| 6,559,931 B2 | 5/2003 | Kawamura et al. |
| 6,563,569 B2 | 5/2003 | Osawa et al. |
| 6,567,101 B1 | 5/2003 | Thomas |
| 6,573,883 B1 | 6/2003 | Bartlett |
| 6,573,981 B2 | 6/2003 | Kumagai et al. |
| 6,583,862 B1 | 6/2003 | Perger |
| 6,587,244 B1 | 7/2003 | Ishinabe et al. |
| 6,624,916 B1 | 9/2003 | Green et al. |
| 6,633,367 B2 | 10/2003 | Gogolla |
| 6,646,732 B2 | 11/2003 | Ohtomo et al. |
| 6,667,798 B1 | 12/2003 | Markendorf et al. |
| 6,668,466 B1 | 12/2003 | Bieg et al. |
| 6,678,059 B2 | 1/2004 | Cho et al. |
| 6,681,031 B2 | 1/2004 | Cohen et al. |
| 6,727,984 B2 | 4/2004 | Becht |
| 6,727,985 B2 | 4/2004 | Giger |
| 6,754,370 B1 | 6/2004 | Hall-Holt et al. |
| 6,765,653 B2 | 7/2004 | Shirai et al. |
| 6,802,133 B2 | 10/2004 | Jordil et al. |
| 6,847,436 B2 | 1/2005 | Bridges |
| 6,859,744 B2 | 2/2005 | Giger |
| 6,864,966 B2 | 3/2005 | Giger |
| 6,935,036 B2 | 8/2005 | Raab et al. |
| 6,957,493 B2 | 10/2005 | Kumagai et al. |
| 6,964,113 B2 | 11/2005 | Bridges et al. |
| 6,965,843 B2 | 11/2005 | Raab et al. |
| 6,980,881 B2 | 12/2005 | Greenwood et al. |
| 6,996,912 B2 | 2/2006 | Raab et al. |
| 6,996,914 B1 | 2/2006 | Istre et al. |
| 7,022,971 B2 | 4/2006 | Ura et al. |
| 7,023,531 B2 | 4/2006 | Gogolla et al. |
| 7,055,253 B2 | 6/2006 | Kaneko |
| 7,072,032 B2 | 7/2006 | Kumagai et al. |
| 7,086,169 B1 | 8/2006 | Bayham et al. |
| 7,095,490 B2 | 8/2006 | Ohtomo et al. |
| 7,099,000 B2 | 8/2006 | Connolly |
| 7,129,927 B2 | 10/2006 | Mattsson |
| 7,130,035 B2 | 10/2006 | Ohtomo et al. |
| 7,168,174 B2 | 1/2007 | Piekutowski |
| 7,177,014 B2 | 2/2007 | Mori et al. |
| 7,193,695 B2 | 3/2007 | Sugiura |
| 7,196,776 B2 | 3/2007 | Ohtomo et al. |
| 7,222,021 B2 | 5/2007 | Ootomo et al. |
| 7,224,444 B2 | 5/2007 | Stierle et al. |
| 7,230,689 B2 | 6/2007 | Lau |
| 7,233,316 B2 | 6/2007 | Smith et al. |
| 7,246,030 B2 | 7/2007 | Raab et al. |
| 7,248,374 B2 | 7/2007 | Bridges |
| 7,256,899 B1 | 8/2007 | Faul et al. |
| 7,262,863 B2 | 8/2007 | Schmidt et al. |
| 7,274,802 B2 | 9/2007 | Kumagai et al. |
| 7,285,793 B2 | 10/2007 | Husted |
| 7,286,246 B2 | 10/2007 | Yoshida |
| 7,304,729 B2 | 12/2007 | Yasutomi et al. |
| 7,307,710 B2 | 12/2007 | Gatsios et al. |
| 7,312,862 B2 | 12/2007 | Zumbrunn et al. |
| 7,321,420 B2 | 1/2008 | Yasutomi et al. |
| 7,325,326 B1 | 2/2008 | Istre et al. |
| 7,327,446 B2 | 2/2008 | Cramer et al. |
| 7,336,346 B2 | 2/2008 | Aoki et al. |
| 7,339,655 B2 | 3/2008 | Nakamura et al. |
| 7,345,748 B2 | 3/2008 | Sugiura et al. |
| 7,352,446 B2 | 4/2008 | Bridges et al. |
| 7,372,558 B2 | 5/2008 | Kaufman et al. |
| 7,388,654 B2 | 6/2008 | Raab et al. |
| 7,388,658 B2 | 6/2008 | Glimm |
| 7,401,783 B2 | 7/2008 | Pryor |
| 7,423,742 B2 | 9/2008 | Gatsios et al. |
| 7,446,863 B2 | 11/2008 | Nishita et al. |
| 7,453,554 B2 | 11/2008 | Yang et al. |
| 7,466,401 B2 | 12/2008 | Cramer et al. |
| 7,471,377 B2 | 12/2008 | Liu et al. |
| 7,474,388 B2 | 1/2009 | Ohtomo et al. |
| 7,480,037 B2 | 1/2009 | Palmateer et al. |
| 7,492,444 B2 | 2/2009 | Osada |
| 7,503,123 B2 | 3/2009 | Matsuo et al. |
| 7,511,824 B2 | 3/2009 | Sebastian et al. |
| 7,518,709 B2 | 4/2009 | Oishi et al. |
| 7,535,555 B2 | 5/2009 | Nishizawa et al. |
| 7,541,965 B2 | 6/2009 | Ouchi et al. |
| 7,552,539 B2 | 6/2009 | Piekutowski |
| 7,555,766 B2 | 6/2009 | Kondo et al. |
| 7,562,459 B2 | 7/2009 | Fourquin et al. |
| 7,564,538 B2 | 7/2009 | Sakimura et al. |
| 7,565,216 B2 | 7/2009 | Soucy |
| 7,583,375 B2 | 9/2009 | Cramer et al. |
| 7,586,586 B2 | 9/2009 | Constantikes |
| 7,613,501 B2 * | 11/2009 | Scherch ..................... 600/427 |
| 7,614,019 B2 | 11/2009 | Ribikauskas et al. |
| D605,959 S | 12/2009 | Apotheloz |
| 7,634,374 B2 | 12/2009 | Chouinard et al. |
| 7,634,381 B2 | 12/2009 | Westermark et al. |
| 7,692,628 B2 | 4/2010 | Smith et al. |
| 7,701,559 B2 | 4/2010 | Bridges et al. |
| 7,701,566 B2 | 4/2010 | Kumagai et al. |
| 7,705,830 B2 | 4/2010 | Westerman et al. |
| 7,710,396 B2 | 5/2010 | Smith et al. |
| 7,724,380 B2 | 5/2010 | Horita et al. |
| 7,728,963 B2 | 6/2010 | Kirschner |
| 7,738,083 B2 | 6/2010 | Luo et al. |
| 7,751,654 B2 | 7/2010 | Lipson et al. |
| 7,761,814 B2 | 7/2010 | Rimas-Ribikauskas et al. |
| 7,765,084 B2 | 7/2010 | Westermark et al. |
| 7,782,298 B2 | 8/2010 | Smith et al. |
| 7,800,758 B1 | 9/2010 | Bridges et al. |
| 7,804,051 B2 | 9/2010 | Hingerling et al. |
| 7,804,602 B2 | 9/2010 | Raab |
| 7,812,736 B2 | 10/2010 | Collingwood et al. |
| 7,812,969 B2 | 10/2010 | Morimoto et al. |
| D629,314 S | 12/2010 | Ogasawara |
| 7,876,457 B2 | 1/2011 | Rueb |
| 7,903,237 B1 | 3/2011 | Li |
| 7,929,150 B1 | 4/2011 | Schweiger |
| 7,976,387 B2 | 7/2011 | Venkatesh et al. |
| 7,983,872 B2 | 7/2011 | Makino et al. |
| 7,990,523 B2 | 8/2011 | Schlierbach et al. |
| 7,990,550 B2 | 8/2011 | Aebischer et al. |
| 8,087,315 B2 | 1/2012 | Goossen et al. |
| 8,094,121 B2 | 1/2012 | Obermeyer et al. |
| 8,094,212 B2 | 1/2012 | Jelinek |
| 8,217,893 B2 | 7/2012 | Quinn et al. |
| 8,237,934 B1 | 8/2012 | Cooke et al. |
| 8,314,939 B2 | 11/2012 | Kato |
| 8,320,708 B2 | 11/2012 | Kurzweil et al. |
| 8,379,224 B1 | 2/2013 | Piasse et al. |
| 8,405,604 B2 | 3/2013 | Pryor et al. |
| 8,422,034 B2 | 4/2013 | Steffensen et al. |
| 8,437,011 B2 | 5/2013 | Steffensen et al. |
| 8,467,072 B2 | 6/2013 | Cramer et al. |
| 8,483,512 B2 | 7/2013 | Moeller |
| 8,509,949 B2 | 8/2013 | Bordyn et al. |
| 8,537,375 B2 | 9/2013 | Steffensen et al. |
| 8,553,212 B2 | 10/2013 | Jaeger et al. |
| 8,654,354 B2 | 2/2014 | Steffensen et al. |
| 8,699,756 B2 | 4/2014 | Jensen |
| 2002/0093646 A1 | 7/2002 | Muraoka |
| 2002/0148133 A1 | 10/2002 | Bridges et al. |
| 2003/0014212 A1 | 1/2003 | Ralston et al. |
| 2003/0066202 A1 | 4/2003 | Eaton |
| 2003/0090682 A1 | 5/2003 | Gooch et al. |
| 2003/0112449 A1 | 6/2003 | Tu et al. |
| 2003/0133092 A1 | 7/2003 | Rogers |
| 2003/0179362 A1 | 9/2003 | Osawa et al. |
| 2003/0206285 A1 | 11/2003 | Lau |
| 2004/0041996 A1 | 3/2004 | Abe |
| 2004/0075823 A1 | 4/2004 | Lewis et al. |
| 2004/0223139 A1 | 11/2004 | Vogel |
| 2005/0147477 A1 | 7/2005 | Clark |
| 2005/0185182 A1 | 8/2005 | Raab et al. |
| 2005/0197145 A1 | 9/2005 | Chae et al. |
| 2005/0254043 A1 | 11/2005 | Chiba |

(56) References Cited

U.S. PATENT DOCUMENTS

| | | |
|---|---|---|
| 2005/0284937 A1 | 12/2005 | Xi et al. |
| 2006/0009929 A1 | 1/2006 | Boyette et al. |
| 2006/0053647 A1 | 3/2006 | Raab et al. |
| 2006/0055662 A1 | 3/2006 | Rimas-Ribikauskas et al. |
| 2006/0055685 A1 | 3/2006 | Rimas-Ribikauskas et al. |
| 2006/0066836 A1 | 3/2006 | Bridges et al. |
| 2006/0103853 A1 | 5/2006 | Palmateer |
| 2006/0132803 A1 | 6/2006 | Clair et al. |
| 2006/0145703 A1 | 7/2006 | Steinbichler et al. |
| 2006/0146009 A1 | 7/2006 | Syrbe et al. |
| 2006/0161379 A1 | 7/2006 | Ellenby et al. |
| 2006/0164384 A1 | 7/2006 | Smith et al. |
| 2006/0164385 A1 | 7/2006 | Smith et al. |
| 2006/0164386 A1 | 7/2006 | Smith et al. |
| 2006/0222237 A1 | 10/2006 | Du et al. |
| 2006/0222314 A1 | 10/2006 | Zumbrunn et al. |
| 2006/0235611 A1 | 10/2006 | Deaton |
| 2006/0262001 A1 | 11/2006 | Ouchi et al. |
| 2007/0016386 A1 | 1/2007 | Husted |
| 2007/0019212 A1 | 1/2007 | Gatsios et al. |
| 2007/0024842 A1 | 2/2007 | Nishizawa et al. |
| 2007/0090309 A1 | 4/2007 | Hu et al. |
| 2007/0121095 A1 | 5/2007 | Lewis |
| 2007/0127013 A1 | 6/2007 | Hertzman et al. |
| 2007/0130785 A1 | 6/2007 | Bublitz et al. |
| 2007/0236452 A1 | 10/2007 | Venkatesh et al. |
| 2007/0247615 A1 | 10/2007 | Bridges et al. |
| 2007/0285672 A1 | 12/2007 | Mukai et al. |
| 2008/0002866 A1 | 1/2008 | Fujiwara |
| 2008/0024795 A1 | 1/2008 | Yamamoto et al. |
| 2008/0043409 A1 | 2/2008 | Kallabis |
| 2008/0122786 A1 | 5/2008 | Pryor et al. |
| 2008/0203299 A1 | 8/2008 | Kozuma et al. |
| 2008/0229592 A1 | 9/2008 | Hinderling et al. |
| 2008/0239281 A1 | 10/2008 | Bridges |
| 2008/0309949 A1 | 12/2008 | Rueb |
| 2008/0316497 A1 | 12/2008 | Taketomi et al. |
| 2008/0316503 A1 | 12/2008 | Smarsh et al. |
| 2009/0009747 A1 | 1/2009 | Wolf et al. |
| 2009/0033621 A1 | 2/2009 | Quinn et al. |
| 2009/0046271 A1 | 2/2009 | Constantikes |
| 2009/0066932 A1 | 3/2009 | Bridges et al. |
| 2009/0157226 A1 | 6/2009 | De Smet |
| 2009/0171618 A1 | 7/2009 | Kumagai et al. |
| 2009/0190125 A1 | 7/2009 | Foster et al. |
| 2009/0213073 A1 | 8/2009 | Obermeyer et al. |
| 2009/0239581 A1 | 9/2009 | Lee |
| 2009/0240372 A1 | 9/2009 | Bordyn et al. |
| 2009/0240461 A1 | 9/2009 | Makino et al. |
| 2009/0240462 A1 | 9/2009 | Lee |
| 2010/0058252 A1 | 3/2010 | Ko |
| 2010/0091112 A1 | 4/2010 | Veeser et al. |
| 2010/0128259 A1 | 5/2010 | Bridges et al. |
| 2010/0142798 A1 | 6/2010 | Weston et al. |
| 2010/0149518 A1 | 6/2010 | Nordenfelt et al. |
| 2010/0149525 A1 | 6/2010 | Lau |
| 2010/0176270 A1 | 7/2010 | Lau et al. |
| 2010/0207938 A1 | 8/2010 | Yau et al. |
| 2010/0225746 A1 | 9/2010 | Shpunt et al. |
| 2010/0234094 A1 | 9/2010 | Gagner et al. |
| 2010/0235786 A1 | 9/2010 | Maizels et al. |
| 2010/0245851 A1 | 9/2010 | Teodorescu |
| 2010/0250175 A1 | 9/2010 | Briggs et al. |
| 2010/0265316 A1 | 10/2010 | Sali et al. |
| 2010/0277747 A1 | 11/2010 | Rueb et al. |
| 2010/0284082 A1 | 11/2010 | Shpunt et al. |
| 2011/0007154 A1 | 1/2011 | Vogel et al. |
| 2011/0023578 A1 | 2/2011 | Grasser |
| 2011/0025827 A1 | 2/2011 | Shpunt et al. |
| 2011/0032509 A1 | 2/2011 | Bridges et al. |
| 2011/0035952 A1 | 2/2011 | Roithmeier |
| 2011/0043620 A1 | 2/2011 | Svanholm et al. |
| 2011/0043808 A1 | 2/2011 | Isozaki et al. |
| 2011/0052006 A1 | 3/2011 | Gurman et al. |
| 2011/0069322 A1 | 3/2011 | Hoffer, Jr. |
| 2011/0107611 A1 | 5/2011 | Desforges et al. |
| 2011/0107612 A1 | 5/2011 | Ferrari et al. |
| 2011/0107613 A1 | 5/2011 | Tait |
| 2011/0107614 A1 | 5/2011 | Champ |
| 2011/0109502 A1 | 5/2011 | Sullivan |
| 2011/0112786 A1 | 5/2011 | Desforges et al. |
| 2011/0123097 A1 | 5/2011 | Van Coppenolle et al. |
| 2011/0166824 A1 | 7/2011 | Haisty et al. |
| 2011/0169924 A1 | 7/2011 | Haisty et al. |
| 2011/0173827 A1 | 7/2011 | Bailey et al. |
| 2011/0175745 A1 | 7/2011 | Atwell et al. |
| 2011/0179281 A1 | 7/2011 | Chevallier-Mames et al. |
| 2011/0181872 A1 | 7/2011 | Dold et al. |
| 2011/0260033 A1 | 10/2011 | Steffensen et al. |
| 2012/0050255 A1 | 3/2012 | Thomas et al. |
| 2012/0062706 A1 | 3/2012 | Keshavmurthy et al. |
| 2012/0099117 A1 | 4/2012 | Hanchett et al. |
| 2012/0105821 A1 | 5/2012 | Moser et al. |
| 2012/0120391 A1 | 5/2012 | Dold et al. |
| 2012/0120415 A1 | 5/2012 | Steffensen et al. |
| 2012/0154577 A1 | 6/2012 | Yoshikawa et al. |
| 2012/0188559 A1 | 7/2012 | Becker et al. |
| 2012/0218563 A1 | 8/2012 | Spruck et al. |
| 2012/0262550 A1 | 10/2012 | Bridges |
| 2012/0262573 A1 | 10/2012 | Bridges et al. |
| 2012/0262728 A1 | 10/2012 | Bridges et al. |
| 2012/0265479 A1 | 10/2012 | Bridges et al. |
| 2013/0096873 A1 | 4/2013 | Rosengaus et al. |
| 2013/0100282 A1 | 4/2013 | Siercks et al. |
| 2013/0162469 A1 | 6/2013 | Zogg et al. |
| 2014/0002806 A1 | 1/2014 | Buchel et al. |
| 2014/0028805 A1 | 1/2014 | Tohme et al. |

FOREIGN PATENT DOCUMENTS

| | | |
|---|---|---|
| CN | 1531659 A | 9/2004 |
| CN | 101031817 A | 9/2007 |
| DE | 3530922 A1 | 4/1986 |
| DE | 3827458 A1 | 2/1990 |
| DE | 102004024171 A1 | 9/2005 |
| DE | 102006013185 A1 | 9/2007 |
| DE | 202006020299 U1 | 5/2008 |
| DE | 60319016 | 4/2009 |
| EP | 0166106 | 1/1986 |
| EP | 598523 A1 | 5/1994 |
| EP | 0797076 A2 | 9/1997 |
| EP | 0919831 A2 | 6/1999 |
| EP | 0957336 A2 | 11/1999 |
| EP | 1067363 A2 | 1/2001 |
| EP | 1519141 | 3/2005 |
| EP | 1607767 A1 | 12/2005 |
| EP | 2177868 A2 | 10/2009 |
| EP | 2136178 A1 | 12/2009 |
| EP | 2259010 A1 | 12/2010 |
| EP | 2259013 A1 | 12/2010 |
| JP | 57147800 | 9/1982 |
| JP | S5804881 | 1/1983 |
| JP | 2184788 | 7/1990 |
| JP | H0465361 A | 3/1992 |
| JP | 06097288 | 4/1994 |
| JP | H10317874 A | 12/1998 |
| JP | 11337642 | 12/1999 |
| JP | 2000275042 | 10/2000 |
| JP | 2001272468 | 10/2001 |
| JP | 2001284317 A | 10/2001 |
| JP | 2001353112 A | 12/2001 |
| JP | 2002098762 | 4/2002 |
| JP | 2002209361 A | 7/2002 |
| JP | 2004508954 A | 3/2004 |
| JP | 2004527751 | 9/2004 |
| JP | 2005265700 | 9/2005 |
| JP | 2007504459 A | 3/2007 |
| JP | 2007256872 A | 10/2007 |
| JP | 2004108939 | 4/2008 |
| JP | 2008514967 | 5/2008 |
| JP | 2009014639 A | 1/2009 |
| JP | 2011158371 A | 8/2011 |
| JP | 2013525787 A | 10/2011 |
| JP | 2012509464 A | 4/2012 |

(56) References Cited

FOREIGN PATENT DOCUMENTS

| | | |
|---|---|---|
| JP | 2012530909 A | 12/2012 |
| JP | 5302976 B2 | 10/2013 |
| WO | 9534849 A1 | 12/1995 |
| WO | 0177613 A1 | 10/2001 |
| WO | 0223121 A1 | 3/2002 |
| WO | 0237466 | 5/2002 |
| WO | 02084327 A2 | 10/2002 |
| WO | 03062744 | 7/2003 |
| WO | 03062744 A1 | 7/2003 |
| WO | 03073121 A1 | 9/2003 |
| WO | 2004063668 | 7/2004 |
| WO | 2006039682 A1 | 4/2006 |
| WO | 2005026772 A2 | 3/2007 |
| WO | 2007079601 | 7/2007 |
| WO | 2007084209 A2 | 7/2007 |
| WO | 2008052348 A1 | 5/2008 |
| WO | 2008119073 A2 | 10/2008 |
| WO | 2010057169 A2 | 5/2010 |
| WO | 2010100043 A1 | 9/2010 |
| WO | 2010141120 A2 | 12/2010 |
| WO | 2010148525 A1 | 12/2010 |
| WO | 2010148526 A1 | 12/2010 |
| WO | 2011035290 | 3/2011 |
| WO | 2011057130 A2 | 5/2011 |
| WO | 2011107729 A1 | 9/2011 |
| WO | WO2010148526 A1 | 12/2012 |

OTHER PUBLICATIONS

FARO Technical Institute, Basic Measurement Training Workbook, Version 1.0, FARO Laster Tracker, Jan. 2008, Students Book, FAO CAM2 Measure.

Kollorz, et al., "Gesture recognition with a time-of-flight camera", International Journal of Intelligent Systems Technologies and Applications, vol. 5, No. 3/4, pp. 334-343, [Retreived Aug. 11, 2011; http://www5.informatik.uni-erlangen.de/Forschung/Publikationen/2008/Kollorz08-GRW.pdf] (2008).

International Search Report for INternational Application No. PCT/US2011/033360 mailed Feb. 29, 2012.

International Search Report of the International Searching Authority for Application No. PCT/US2012/028984; Date of Mailing Jul. 19, 2012.

International Search Report mailed Jun. 29, 2012 for International Application Serial No. PCT/US2012/027083; International filed Feb. 29, 2012.

JP Office Action for Japanese Patent Application No. PCT/US2012028984; Date of Mailing Feb. 17, 2012.

Hecht, Jeff, Photonic Frontiers: Gesture Recognition: Lasers Bring Gesture Recognition to the Home, Laser Focus World, pp. 1-5, [Retrieved On-Line Mar. 3, 2011], http://www.optoiq.com/optoiq-2/en-us/index/photonics-technologies-applications/lfw-display/lfw-articles-toolstemplate.articles.optoiq2.photonics-technologies.technology-products.imaging-_detectors.2011.01.1asers-bringgesture-recognition-to-the-home.html.

Leica Geosystems Metrology, "Leica Absolute Tracker AT401, White Paper," Hexagon AB; 2010.

Leica Geosystems AG ED—"Leica Laser Tracker System", Internet Citation, Jun. 28, 2012, XP002678836, Retrieved from the Internet: URL:http://www.a-solution.com.au/pages/downloads/LTD500_Brochure_EN.pdf.

Maekynen, A. J. et al., Tracking Laser Radar for 3-D Shape Measurements of Large Industrial Objects Based on Time-of-Flight Laser Rangefinding and Position-Sensitive Detection Techniques, IEEE Transactions on Instrumentation and Measurement, vol. 43, No. 1, Feb. 1, 1994, pp. 40-48, XP000460026, ISSN: 0018-9456, DOI 10.1109/19.286353, the whole document.

New River Kinematics, SA Arm—The Ultimate Measurement Software for Arms, Software Release! SA Sep. 30, 2010, [On-line], http://www.kinematics.com/news/software-release-sa20100930.html (1 of 14), [Retrieved Apr. 13, 2011 11:40:47 AM].

Turk, et al., "Perceptual Interfaces", UCSB Technical Report 2003-33, pp. 1-43 [Retreived Aug. 11, 2011, http://www.cs.ucsb.edu/research/tech_reports/reports/2003-33.pdf] (2003).

Li, et al., "Real Time Hand Gesture Recognition using a Range Camera", Australasian Conference on Robotics and Automation (ACRA), [Retreived Aug. 10, 2011, http://www.araa.asn.au/acra/acra2009/papers/pap128s1.pdf] pp. 1-7 (2009).

Leica Geosystems: "TPS1100 Professional Series", 1999, Retrieved from the Internet: URL:http://www.estig.ipbeja.pt/~legvm/top_civil/TPS1100%20-%20A%20New%20Generation%20of%20Total%20Stations.pdf, [Retrieved on Jul. 2012] the whole document.

Cao, et al."VisionWand: Interaction Techniques for Large Displays using a Passive Wand Tracked in 3D", Proceedings of the 16th Annual ACM Symposium on User Interface Software and Technology, UIST, vol. 5, iSSUE 2, pp. 173-182, (Jan. 2003).

Written Opinion of the International Searching Authority for Application No. PCT/US2012/028984; Date of Mailing Jul. 19, 2012.

Written Opinion of the International Searching Authority for International Application No. PCT/US2011/033360 mailed Feb. 29, 2011.

Written Opinion of the International Searching Authority mailed Jun. 29, 2012, for International Application Serial No. PCT/US2012/027083; International filing date Feb. 29, 2012.

"A New Generation of Total Stations from Leica Geosystems." K. Zeiske. Leica Geosystems AG, May 1999, 8 pages.

Combined International Search and Exam Report for Application GB1407387.8 dated May 29, 2014.

Tracker3; Ultra-Portable Laser Tracking System; 4 pages; 2010 Automated Precision Inc.; www.apisensor.com.

2x2 High Speed Lithium Niobate Interferometric Switch; [on-line]; JDS Uniphase Corporation; 2007; Retrieved from www.jdsu.com.

AO Modulator—M040-8J-FxS; [online—technical data sheet]; Gooch & Housego; Nov. 2006; Retrieved from http://www.goochandhousego.com/.

Chen, Junewen, "Novel Laser Range Finding Algorithms", Proceedings of SPIE, vol. 6100, Jan. 1, 2006, pp. 61001Q-61001Q-8, XP55031002, ISSN: 0277-786X, DOI: 10.1117/12.645131, the whole document.

Computer Giants Embrace On-Chip Optics; Mar. 27, 2008; [on-line]; Optics.org; [Retrieved on Apr. 2, 2008]; Retrieved from http://optics.org/cws/article/research/33521.

EOSpace—High-Speed Switches; [on-line technical brochure]; [Retrieved May 18, 2009]; Retrieved from http://www.cospace.com/Switches.htm.

FARO Laser Tracker ION; 2 pages; revised Apr. 23, 2010; FARO Technologies, Inc., www.lasertracker.faro.com.

RS Series Remote Controlled Optical Switch; [on-line technical data sheet]; Sercalo Microtechnology, Ltd. [Retrieved Oct. 14, 2010]; Retreived from http://www.sercalo.com/document/PDFs/DataSheets/RS%20datasheet.pdf.

Hui, Elliot E., et al, "Single-Step Assembly of Complex 3-D Microstructures", Jan. 23, 2000, IEEE; pp. 602-607.

Integrated Optical Amplitude Modulator; [on-line technical data sheet]; [Retrieved Oct. 14, 2010]; Jenoptik; Retrieved from http://www.jenoptik.com/cms/products.nsf/0/A6DF20B50AEE7819C12576FE0074E8E6/$File/amplitudemodulators_en.pdf?Open.

Kester, Walt, Practical Analog Design Techniques, Analog Devices, Section 5, Undersampling Applications, Copyright 1995, pp. 5-1 to 5-34.

LaserTRACER-measureing sub-micron in space; http://www.etalon-ag.com/index.php/en/products/lasertracer; 4 pages; Jun. 28, 2011; Etalon AG.

Leica Absolute Tracker AT401-ASME B89.4.19/2006 Specifications; Hexagon Metrology; Leica Geosystems Metrology Products, Switzerland; 2 pages; www.leica-geosystems.com/metrology.

Lightvision—High Speed Variable Optical Attenuators (VOA); [on-line]; A publication of Lightwaves 2020, Feb. 1, 2008; Retrieved from http://www.lightwaves2020.com/home/.

Making the Big Step from Electronics to Photonics by Modulating a Beam of Light with Electricity; May 18, 2005; [on-line]; [Retrieved

(56) References Cited

OTHER PUBLICATIONS

May 7, 2009]; Cornell University News Service; Retrieved from http://www.news.cornell.edu/stories/May05/LipsonElectroOptica.
Matsumaru, K., "Mobile Robot with Preliminary-Announcement and Display Function of Forthcoming Motion Using Projection Equipment," Robot and Human Interactive Communication, 2006. RO-MAN06. The 15th IEEE International Symposium, pp. 443-450, Sep. 6-8.
MEMS Variable Optical Attenuators Single/Multi-Channel; [on-line]; Jan. 17, 2005; Retrieved from www.ozoptics.com.
Nanona High Speed & Low Loss Optical Switch; [on-line technical data sheet]; [Retrieved Oct. 14, 2010]; Retrieved from http://www.bostonati.com/products/PI-FOS.pdf.
Super-Nyquist Operation of the AD9912 Yields a High RF Output Signal; Analog Devices, Inc., AN-939 Application Note; www.analog.com; Copyright 2007.
Optical Circulator (3-Ports & 4-Ports); [on-line technical data sheet]; Alliance Fiber Optic Products, Inc. REV.D Jan. 15, 2004; Retrieved from www.afop.com.
Optical Circulators Improve Bidirectional Fiber Systems; By Jay S. Van Delden; [online]; [Retrieved May 18, 2009]; Laser Focus World; Retrieved from http://www.laserfocusworld.com/display_artcile/28411/12/nonc/nonc/News/Optical-circulators-improve-bidirecti.
Ou-Yang, Mang, et al., "High-Dynamic-Range Laser Range Finders Based on a Novel Multimodulated Frequency Method", Optical Engineering, vol. 45, No. 12, Jan. 1, 2006, p. 123603, XP55031001, ISSN: 0091-3286, DOI: 10.1117/1.2402517, the whole document.
PCMM System Specifications Leica Absolute Tracker and Leica T-Products; Hexagon Metrology; Leica Geosystems Metrology Products, Switzerland; 8 pages; www.leica-geosystems.com/metrology.
Poujouly, Stephane, et al., Digital Laser Range Finder: Phase-Shift Estimation by Undersampling Technique: IEEE, Copyright 1999.
Poujouly, Stephane, et al., "A Twofold Modulation Frequency Laser Range Finder; A Twofold Modulation Frequency Laser Range Finder", Journal of Optics. A, Pure and Applied Optics, Institute of Physics Publishing, Bristol, GB, vol. 4, No. 6, Nov. 1,2, 2002.
Written Opinion mailed Mar. 19, 2013 for Application Serial No. PCT/US2013/022515.
Cuypers, et al; "Optical Measurement Techniques for Mobile and Large-Scale Dimensional Metrology"; Optics and Lasers in Engineering; vol. 47; p. 292-300; 2009.
Hanwei Xiong et al: "The Development of Optical Fringe Measurement System integrated with a CMM for Products Inspection." Proceedings of SPIE, vol. 7855, Nov. 3, 2010, pp. 78551W-7855W-8, XP055118356. ISSN: 0277-786X.
International Search Report mailed Mar. 19, 2013 for International Application Serial No. PCT/US2013/022515.
Sladek, J., et al: "The Hybrid Contact-Optical Coordinate Measuring System." Measurement, vol. 44, No. 3, Mar. 1, 2011, pp. 503-510.
Parker, et al; "Instrument for Setting Radio Telescope Surfaces"; Proceedings ASPE 2000 Annual Meeting; p. 21-24; XP 55055817A.
Rahman, et al.,; "Spatial-Geometric Approach to Physical Mobile Interaction Based on Accelerometer and IR Sensory Data Fusion"; ACM Transactions on Multimedia Computing, Communications and Applications; vol. 6, No. 4, Article 28; Nov. 2010.
Stone, et al.; "Automated Part Tracking on the Construction Job Site"; Robotics; p. 96-103; 2000.
DE Office Action dated Dec. 4, 2014 corresponding to German App. No. 11 2012 001 254.2.
GB OA dated Nov. 20, 2014 corresponding to GB App. No. GB1407388.6.
GB Office Action dated Nov. 20, 2014 corresponding to GB App. No. 1407389.4.
Japanese Office Action dated Nov. 11, 2014 corresponding to Japanese Patent App. 2014-505328.
Katowski, O. "Optical 3-D Measurement Techniques—Applications in inspection, quality control and robotics" Gruen/Kahmen(Editors), Vienna, Austria, Sep. 18-20, 1989.

\* cited by examiner

AUTOMATIC MEASUREMENT OF DIMENSIONAL DATA WITH A LASER TRACKER

CROSS-REFERENCE TO RELATED APPLICATIONS

The present application is a divisional application of U.S. patent application Ser. No. 13/418,899 filed on Mar. 13, 2012, which is nonprovisional application of U.S. Provisional Patent Application No. 61/452,314 filed Mar. 14, 2011, the entire contents of which are hereby incorporated by reference. U.S. patent application Ser. No. 13/418,899 is also a continuation-in-part application of U.S. patent application Ser. No. 13/340,730 filed Dec. 30, 2011, which is a continuation-in-part application of U.S. patent application Ser. No. 13/090,889 filed Apr. 20, 2011, which is a nonprovisional application of U.S. Provisional Patent Application No. 61/326,294 filed Apr. 21, 2010, the entire contents of all of which are hereby incorporated by reference. U.S. patent application Ser. No. 13/418,899 is further a nonprovisional application of U.S. Provisional Patent Application No. 61/475,703 filed Apr. 15, 2011 and U.S. Provisional Patent Application No. 61/592,049 filed Jan. 30, 2012, the entire contents of both of which are hereby incorporated by reference. U.S. patent application Ser. No. 13/418,899 is also a continuation-in-part application of U.S. patent application Ser. No. 13/407,983 filed Feb. 29, 2012, which is a nonprovisional application of U.S. Provisional Patent Application No. 61/448,823 filed Mar. 3, 2011, the entire contents of both of which are hereby incorporated by reference.

FIELD OF INVENTION

The present disclosure relates to metrology devices, such as, for example, a laser tracker, and more particularly to a laser tracker that automatically identifies each of a plurality of retroreflector targets placed on an object using one or more locator cameras associated with (e.g., as part of) the laser tracker.

BACKGROUND

There is a class of instruments known as a laser tracker that measures the coordinates of a point by sending a laser beam to a retroreflector target in contact with the point. The instrument determines the coordinates of the point by measuring the distance and the two angles to the target. The distance is measured with a distance-measuring device such as an absolute distance meter or an interferometer. The angles are measured with an angle-measuring device such as an angular encoder. A gimbaled beam-steering mechanism within the instrument directs the laser beam to the point of interest.

The laser tracker is a particular type of coordinate-measuring device that tracks the retroreflector target with one or more laser beams it emits. There is another category of instruments known as total stations or tachymeters that may measure a retroreflector or a point on a diffusely scattering surface. Laser trackers, which typically have accuracies on the order of a thousand of an inch and as good as one or two micrometers under certain circumstances, are usually much more accurate than total stations. The broad definition of laser tracker, which includes total stations, is used throughout this application.

Ordinarily the laser tracker sends a laser beam to a retroreflector target that is typically located on the surface of an object to be measured. A common type of retroreflector target is the spherically mounted retroreflector (SMR), which includes a cube-corner retroreflector embedded within a metal sphere. The cube-corner retroreflector includes three mutually perpendicular mirrors. The vertex, which is the common point of intersection of the three mirrors, is located near the center of the sphere. Because of this placement of the cube corner within the sphere, the perpendicular distance from the vertex to any surface of the object on which the SMR rests remains nearly constant, even as the SMR is rotated. Consequently, the laser tracker can measure the 3D coordinates of a surface by following the position of an SMR as it is moved over the surface. Stated another way, the laser tracker needs to measure only three degrees of freedom (one radial distance and two angles) to fully characterize the 3D coordinates of a surface.

Some laser trackers have the ability to measure six degrees of freedom (DOF), which may include three translations, such as x, y, and z, and three rotations, such as pitch, roll, and yaw. An exemplary six-DOF laser tracker system is described in U.S. Pat. No. 7,800,758 ('758) to Bridges, et al., incorporated by reference herein. The '758 patent discloses a probe that holds a cube corner retroreflector, onto which marks have been placed. A retroreflector onto which such marks have been placed is called a six-DOF retroreflector. The cube corner retroreflector is illuminated by a laser beam from the laser tracker, and the marks on the cube corner retroreflector are captured by a camera within the laser tracker. The three orientational degrees of freedom, for example, the pitch, roll, and yaw angles, are calculated based on the image obtained by the camera. The laser tracker measures a distance and two angles to the vertex of the cube-corner retroreflector. When the distance and two angles, which give three translational degrees of freedom of the vertex, are combined with the three orientational degrees of freedom obtained from the camera image, the position of a probe tip, arranged at a prescribed position relative to the vertex of the cube corner retroreflector, can be found. Such a probe tip may be used, for example, to measure the coordinates of a "hidden" feature that is out of the line of sight of the laser beam from the laser tracker.

One common application of a laser tracker is to measure a relatively large object to see how its actual dimensions compare to the design dimensions (e.g., as given by CAD data). There may be several of these objects utilized in a particular application and the objects are typically expected to be identical in geometry. Any distortion in the geometry of the object either initially or developed over time can influence other operations in the overall system that the object is a part of. For example, if the object is bent or twisted in any way it can lead to manufacturing defects and poor product quality.

Typically as known at least three points are required to establish the relationship between the laser tracker and the object for measurement purposes. As is known in the art, the ability of the operator to manually measure these initial points with sufficient accuracy is an area for consideration.

Thus, there is a need for an operator of a laser tracker or similar measurement device to be able to not have to manually measure the targets points (e.g., SMRs). Instead, it would be desirable for the operator of the laser tracker to utilize the camera system in the laser tracker to automatically measure all of the target points required for any particular application, thereby significantly reducing the possibility of operator error in the measurement process and not requiring specialized skills and/or training.

More generally, there is a need for a method and a system in which the laser tracker automatically carries out many of the functions that would previously have to be carried out manually. It would be desirable to quickly obtain consistent measurements with the laser tracker, even if the measurements are carried out by an unskilled operator. Typical measurements include tool inspection measurements; for example, the carriage in a body-in-white assembly line is an example of a tool to be inspected or monitored. Other examples of tools include a sheet metal stamping jig, and an assembly tool for assembling a portion of an aircraft structure. Generally, for almost every part made in an automotive or aerospace application, there is a corresponding tool. Thus, it would be desirable to improve the process of measuring such tools with a laser tracker. In addition, it would be desirable to apply the measurement process to finished parts as well.

SUMMARY

A method for measuring with a system includes the steps of: providing the system including a collection of retroreflector targets and a laser tracker, the collection of retroreflector targets including at least three non-collinear retroreflector targets, the at least three non-collinear retroreflector targets including a first target, a second target, and a third target, the laser tracker in a first frame of reference fixed with respect to tracker surroundings, the laser tracker having a structure, a first light source, an absolute distance meter, a first angular transducer, a second angular transducer, a tracking system, a first camera, a second light source, and a processor, the structure rotatable about a first axis and a second axis, the first light source producing a first light beam that cooperates with the absolute distance meter, the first angular transducer measuring a first angle of rotation about the first axis, the second angular transducer measuring a second angle of rotation about the second axis, the tracking system configured to move the first light beam to a center of any retroreflector target from among the collection of retroreflector targets, the first camera including a first lens system and a first photosensitive array, the second light source providing a second light beam, and the processor configured to operate the laser tracker; storing a list of nominal coordinates for the first target, the second target, the third target, and at least one additional point, the nominal coordinates being three-dimensional coordinates in a second frame of reference; capturing on the first photosensitive array a portion of the light emitted by the second light beam and reflected off the first target, the second target, and the third target; obtaining spot positions on the photosensitive array from the portion of light reflected off each of the first target, second target, and the third target; determining a correspondence between a first spot position, a second spot position, and a third spot position on the first photosensitive array and the nominal coordinates of the first target, the second target, and the third target, respectively; directing the first beam of light to the first target based at least in part on the nominal coordinates of the first target and the first spot position; measuring three-dimensional coordinates of the first target using the absolute distance meter, the first angular transducer, and the second angular transducer; directing the first beam of light to the second target based at least in part on the nominal coordinates of the second target and the second spot position; measuring three-dimensional coordinates of the second target using the absolute distance meter, the first angular transducer, and the second angular transducer; directing the first beam of light to the third target based at least in part on the nominal coordinates of the third target and the third spot position; measuring three-dimensional coordinates of the third target using the absolute distance meter, the first angular transducer, and the second angular transducer; determining three-dimensional coordinates of the at least one additional point in the first frame of reference based at least in part on the measured three-dimensional coordinates of the first target, the second target, the third target, and the nominal coordinates of the at least one additional point; and storing the determined three-dimensional coordinates of the at least one additional point.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES.

DETAILED DESCRIPTION

Figure 1:
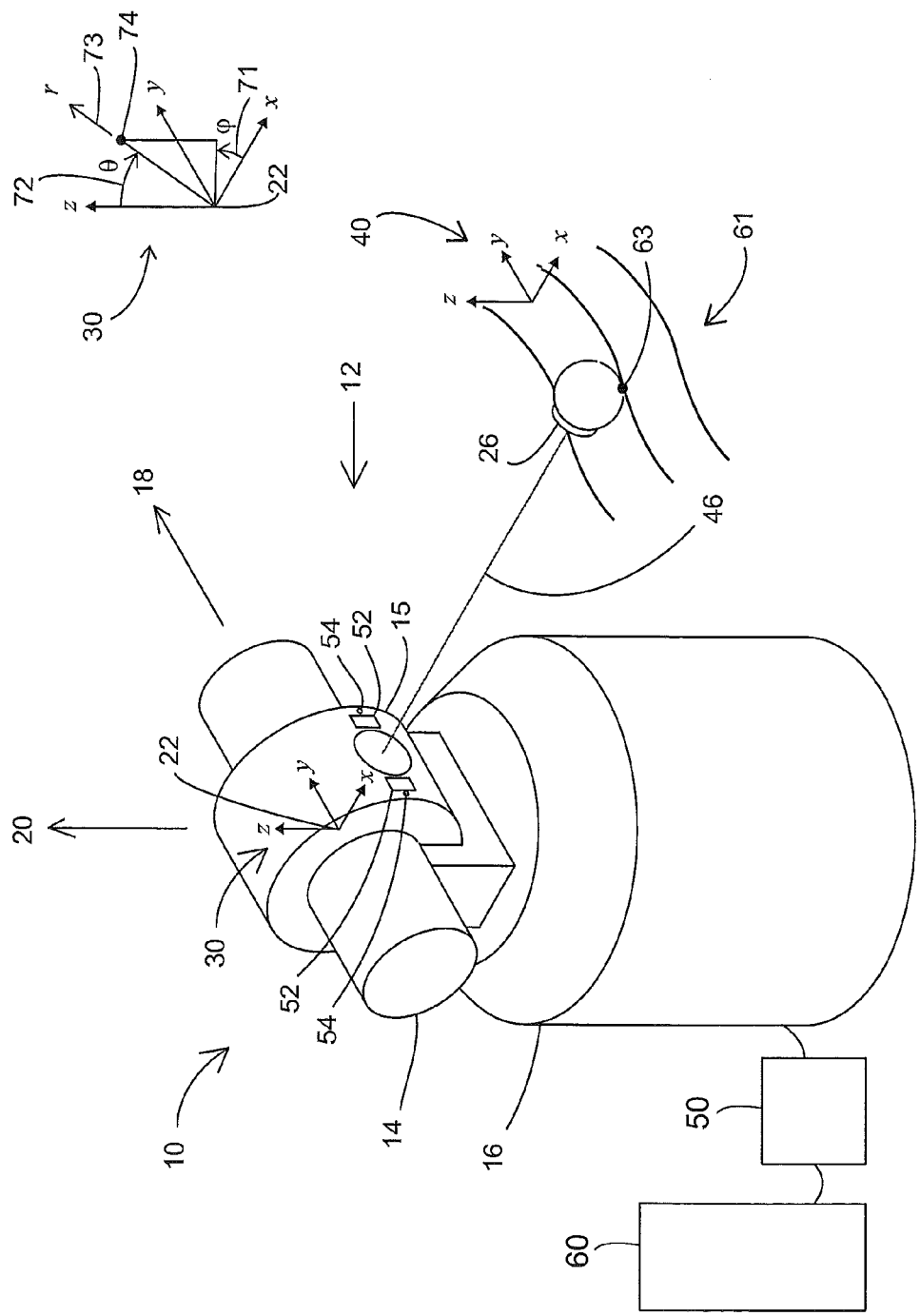
FIG. 1 is a perspective view of a laser tracker, an auxiliary unit, and an external computer according to an embodiment.

An exemplary laser tracker 10 is illustrated in FIG. 1. An exemplary gimbaled beam-steering mechanism 12 of laser tracker 10 includes zenith carriage 14 mounted on azimuth base 16 and rotated about azimuth axis 20. Payload 15 is mounted on zenith carriage 14 and rotated about zenith axis 18. Zenith mechanical rotation axis (not shown) and azimuth mechanical rotation axis (not shown) intersect orthogonally, internally to tracker 10, at gimbal point 22, which is typically the origin for distance measurements. Laser beam 46 virtually passes through gimbal point 22 and is pointed orthogonal to zenith axis 18. In other words, laser beam 46 is in a plane normal to zenith axis 18. Laser beam 46 is pointed in the desired direction by motors within the tracker (not shown) that rotate payload 15 about zenith axis 18 and azimuth axis 20. Zenith and azimuth angular encoders, internal to the tracker (not shown), are attached to zenith mechanical axis (not shown) and azimuth mechanical axis (not shown) and indicate, to relatively high accuracy, the angles of rotation. Laser beam 46 travels to external retroreflector 26 such as the spherically mounted retroreflector (SMR) described above. By measuring the radial distance between gimbal point 22 and retroreflector 26 and the rotation angles about the zenith and azimuth axes 18, 20, the position of retroreflector 26 is found within the spherical coordinate system of the tracker.

The laser tracker 10 is a device that has a device frame of reference 30. The device frame of reference may have as its origin the gimbal point 22. The frame of reference may be fixed with respect to the azimuth base 16, which is typically stationary with respect to the surroundings. The device frame of reference may be represented by a variety of coordinate systems. One type of coordinate system is a Cartesian coordinate system having three perpendicular axes x, y, and z. Another type of coordinate system is a spherical coordinate system. A point 74 within a spherical coordinate 30 may be represented in a spherical coordinate system by one radial distance 73 (r), a first (zenith) angle 72 ($\theta$), and a second (azimuth) angle 71 ($\phi$). The angle $\theta$ is obtained by using the projection of the point 74 onto the z axis. The angle $\phi$ is obtained by using the projection of the point 74 onto the x-y plane. The laser tracker 10 inherently makes measurements in a spherical coordinate system, but a point measured in spherical coordinates may be easily converted to Cartesian coordinates.

The target 26 may be in contact with an object under test 61. The object under test 61 has an object frame of reference 40. The object frame of reference may be represented, for example, using Cartesian coordinates x, y, and z. The x, y, and z axes of the object frame of reference 40 move with the object 61 and are not necessarily parallel to the corresponding device axes x, y, and z of the device frame of reference 30. The target 26 may be placed in contact with the object surface 61 at a point 63. To find the three-dimensional (3D) coordinates of the point 63, the tracker first determines the center of the target 26 using the distance and two angles it has measured. It may also be used to account for a vector offset of the retroreflector reference point (e.g., cube-corner vertex) with respect to the center of the spherical contact surface of the target 26. To move from the center of the target to the surface of the workpiece, the position of the center point is offset by an amount equal to the radius of the spherical target surface. In an embodiment, the direction of the offset is found by measuring several points near to the contact point 63 to determine the surface normal at the point 63.

Laser beam 46 may include one or more laser wavelengths. For the sake of clarity and simplicity, a steering mechanism of the sort shown in FIG. 1 is assumed in the following discussion. However, other types of steering mechanisms are possible. For example, it would be possible to reflect a laser beam off a mirror rotated about the azimuth and zenith axes. As another example, it would be possible to steer the light beam by using two steering mirrors driven by actuators such as galvanometer motors. In this latter case, the light beam could be steering without providing azimuth and zenith mechanical axes. The techniques described herein are applicable, regardless of the type of steering mechanism.

In exemplary laser tracker 10, cameras 52 and light sources 54 are located on payload 15. Light sources 54 illuminate one or more retroreflector targets 26. In an embodiment, light sources 54 are LEDs electrically driven to repetitively emit pulsed light. Each camera 52 includes a photosensitive array and a lens placed in front of the photosensitive array. The photosensitive array may be a CMOS or CCD array, for example. In an embodiment, the lens has a relatively wide field of view, for example, 30 or 40 degrees. The purpose of the lens is to form an image on the photosensitive array of objects within the field of view of the lens. Usually at least one light source 54 is placed near camera 52 so that light from light source 54 is reflected off each retroreflector target 26 onto camera 52. (To illuminate a retroreflector target in a way that can be seen on the camera 52, the light source 54 must be near the camera; otherwise the reflected light will be reflected at too large an angle and will miss the camera.) In this way, retroreflector images are readily distinguished from the background on the photosensitive array as their image spots are brighter than background objects and are pulsed. In an embodiment, there are two cameras 52 and two light sources 54 placed about the line of laser beam 46. By using two cameras in this way, the principle of triangulation can be used to find the three-dimensional coordinates of any SMR within the field of view of the camera. In addition, the three-dimensional coordinates of an SMR can be monitored as the SMR is moved from point to point. A use of two cameras for this purpose is described in U.S. Published Patent Application No. 2010/0128259 to Bridges, et al., the contents of which are herein incorporated by reference.

Auxiliary unit 50 may be a part of laser tracker 10. The purpose of auxiliary unit 50 is to supply electrical power to the laser tracker body and in some cases to also supply computing and clocking capability to the system. It is possible to eliminate auxiliary unit 50 altogether by moving the functionality of auxiliary unit 50 into the tracker body. In most cases, auxiliary unit 50 is attached to general purpose computer 60. Application software loaded onto general purpose computer 60 may provide application capabilities such as reverse engineering. It is also possible to eliminate general purpose computer 60 by building its computing capability directly into laser tracker 10. In this case, a user interface, possibly providing keyboard and mouse functionality may be built into laser tracker 10. The connection between auxiliary unit 50 and computer 60 may be wireless or through a cable of electrical wires. Computer 60 may be connected to a network, and auxiliary unit 50 may also be connected to a network. Plural instruments, for example, multiple measurement instruments or actuators, may be connected together, either through computer 60 or auxiliary unit 50. In an embodiment, auxiliary unit is omitted and connections are made directly between laser tracker 10 and computer 60.

In alternative embodiments of the present invention, the laser tracker 10 may utilize both wide field of view (FOV) and narrow FOV cameras 52 together on the laser tracker 10. Various exemplary methods of using such cameras together are described hereinbelow.

In a first embodiment, one of the cameras 52 in FIG. 1 is a narrow FOV camera and the other camera 52 is a wide FOV camera. With this arrangement, the wide FOV camera 52 identifies the retroreflective targets 26 over a relatively wider angular extent. The laser tracker 10 turns the light beam 46 in the direction of a particular selected retroreflector target 26 until the retroreflector target 26 is within the FOV of the narrow FOV camera 52. The laser tracker 10 may then carry out a method described hereinafter for finding the location of a retroreflector target using images on the two cameras 52 mounted on the laser tracker 10. This is done to find the best estimate for the position of the retroreflector target 26.

Figure 2:
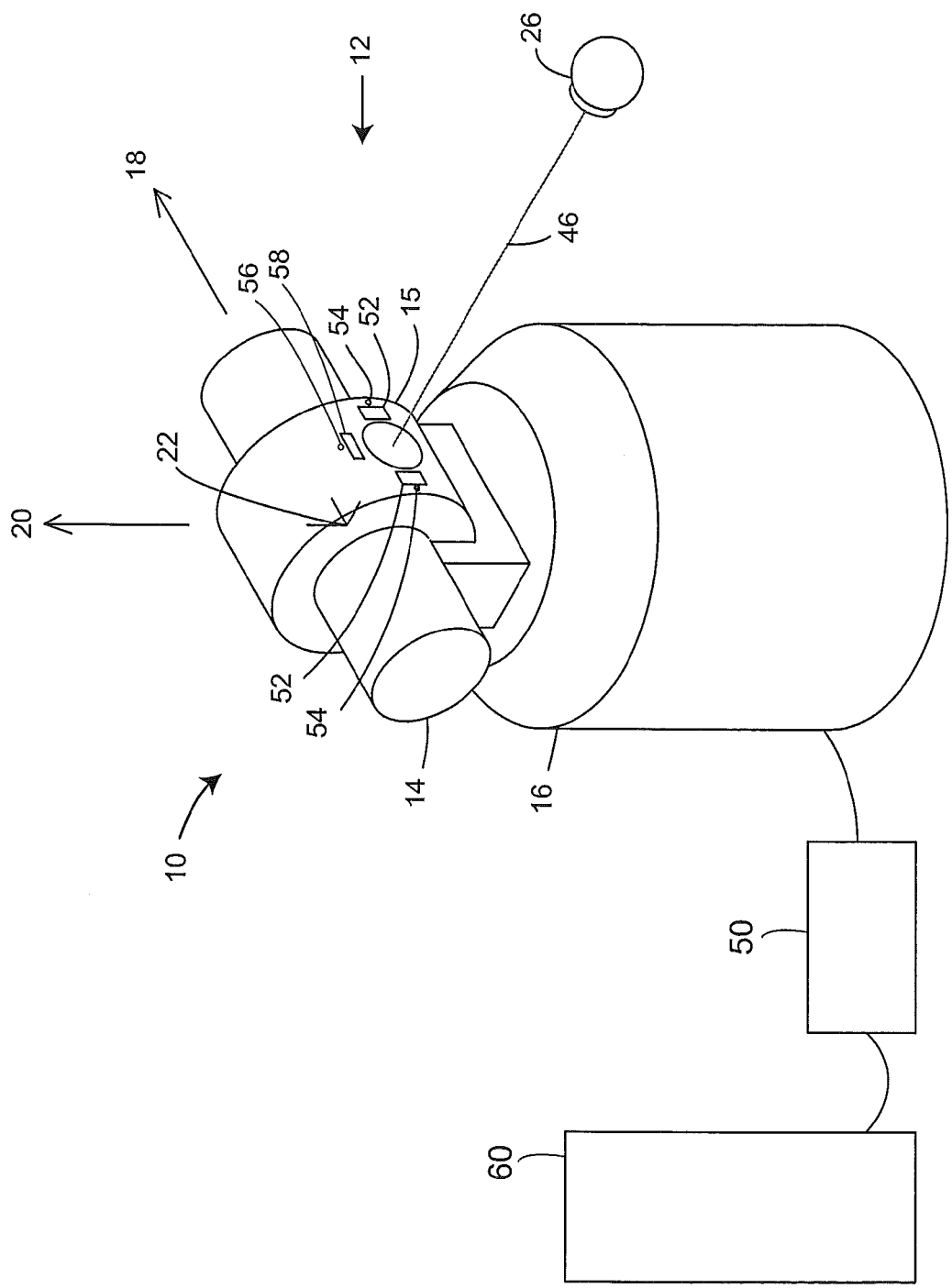
FIG. 2 is a perspective view of the laser tracker of FIG. 1 with an additional narrow field of view camera and associated light source according to an embodiment.

In another embodiment illustrated in FIG. 2, both of the cameras 52 are wide FOV cameras. In addition, there is a narrow FOV camera 58 and a nearby light source 56. The two wide FOV cameras 52 determine the three-dimensional location of the retroreflector target 26 and turn the tracker light beam 46 toward the target 26. When the narrow FOV camera 58 also sees the retroreflector target 26, the information provided by all three cameras 52, 58 is used to calculate the three-dimensional location of the retroreflector target 26.

In still another embodiment, the two wide FOV cameras 52 in FIG. 1 are used to locate the target and turn the laser beam toward it. An orientation camera, similar to orientation camera 210 shown in FIGS. 2 and 7 of the aforementioned U.S. Pat. No. 7,800,758 ('758) to Bridges, et al., which is incorporated herein by reference, views a small region around the illuminated retroreflector target 26. By observing the position of the retroreflector 26 in the photosensitive array of the orientation camera 210, the laser tracker 10 can immediately direct the laser beam 46 to the center of the retroreflector 26.

The method for finding the location of a retroreflector target using images on the two cameras 52 mounted on the front of the laser tracker 10 of FIGS. 1 and 2 is now described.

Five frames of reference are associated with the laser tracker 10: a payload frame of reference that rotates with the payload 15; an azimuth frame of reference that rotates with the zenith carriage 14; a tracker-world frame of reference that is fixed with respect to the azimuth base 16; and two camera frames of reference. The azimuth base 16 is stationary with respect to its surroundings. The cameras 52 include a lens system (not shown) and a photosensitive array (not shown). Representative illustrations of a camera containing a lens system and a photosensitive array are given in FIGS. 4A-B.

In an embodiment, the payload frame of reference has an origin at the gimbal point 22, which lies at a point along the azimuth axis; a y axis parallel to the zenith direction; an x axis perpendicular to the y axis and approximately parallel to the laser beam; and a z axis perpendicular to the x and y axes. The cameras 52 are fixed with respect to the payload frame of reference.

In an embodiment, the azimuth frame of reference has an origin at the gimbal point 22; a z axis along the azimuth direction; a y axis parallel to the zenith axis and perpendicular to the z axis; and an x axis perpendicular to the y and z axes.

In an embodiment, the tracker-world frame of reference has an origin at the gimbal point 22; a z axis along the azimuth axis; a y axis perpendicular to the z axis and parallel to the zenith axis when the angle of the azimuth axis is set to zero degrees; and an x axis perpendicular to the y and z axes.

In an embodiment, a camera frame of reference has an x axis that is the optical axis of the lens system within the camera. The y axis and z axis are perpendicular to the x axis and to each other and are aligned with the rows and columns, respectively, of the pixels of the photosensitive array within the camera 52.

In the laser tracker 10, a zenith angle and an azimuth angle, which are angles of rotation about the zenith and azimuth axes, respectively, are measured by the zenith encoder and azimuth encoder, respectively. With knowledge of the zenith and azimuth angles and the equations of the camera optical axes in the payload frame of reference, it is possible to transform any one of the five frames of reference—payload frame of reference, azimuth frame of reference, tracker-world frame of reference, and two camera frames of reference—into any of the other frames of reference. This is usually done using a transformation matrix, which is a 4×4 matrix including a 3×3 rotation matrix and a scaling component that enables translation. The use of transformation matrices is well known to those of ordinary skill in the art.

The cameras 52 and lights 54 are used to find the location of one or more retroreflector targets 26 in the payload frame of reference or any other frame of reference. Such targets can be automatically acquired, if desired, by the laser tracker 10.

The method for finding a retroreflective target in the payload frame of reference will now be described. A first step in the method is to turn on the lights 54 to illuminate the retroreflectors 26 and form an image on the cameras 52. In some cases, the illumination may be turned off briefly and the difference taken between the illuminated and non-illuminated scenes. In this way, background features can be removed, causing the retroreflector target to be revealed more clearly. A second step is use a processor (e.g., processor 50) to calculate a center point for each retroreflector spot on the photosensitive array of the camera 52. The center point may, for example, be calculated as a centroid. A third step is to establish a direction in the camera frame of reference for each of the center points. With the simplest approximation, the direction is found by drawing a line between the center point and the perspective center of the camera 52. A more sophisticated analysis may consider aberrations of the lens system in determining the direction. A fourth step is to convert into the payload frame of reference the coordinates of the perspective center and the directions for each of the center points. A fifth step is to find a best estimate for the position of the retroreflector target 26 in the payload frame of reference by solving simultaneous equations, as explained hereinbelow.

For each retroreflector target 26, a center point will be formed on the photosensitive arrays of each of the two cameras 52 and from these center points a line indicating the direction from each of the cameras to the retroreflector target 26 will be constructed. In the ideal case, the two lines intersect in a point, but in general, the two lines will be skew lines that do not exactly intersect. The best estimate of the intersection position for two skew lines is found by determining a line segment of closest approach. The line segment of closest approach is perpendicular to each of the two skew lines and is shorter than any other line segment perpendicular to the two skew lines. Ordinarily, the best estimate of the position of the retroreflector target 26 is the midpoint of the line segment of closest approach.

Figure 3:
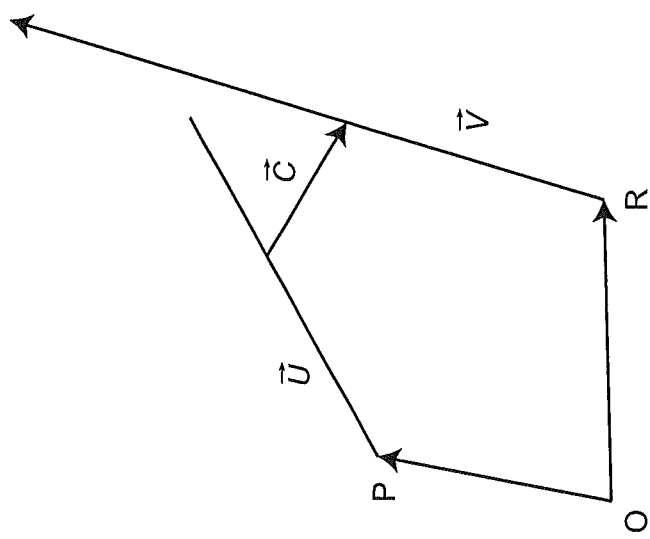
FIG. 3 illustrates a two-dimensional representation of a three-dimensional vector diagram.

FIG. 3 illustrates a two-dimensional representation of a three-dimensional vector diagram. Such a representation may be obtained, for example, in a top view wherein the tracker and the retroreflector target are viewed looking down from above. The point O is the origin of the payload frame of reference. The vectors P and R extend from the origin of the laser tracker to a first camera and a second camera, respectively. The vector U represents the line passing through the perspective center of the first camera and having a direction calculated according to the third step in the method above. The vector V represents the line passing through the perspective center of the second camera and having a direction calculated according to the third step in the method above. The vector C represents the line segment that extends from a first point on the vector U to a second point on the vector V. The vector C is perpendicular to the vectors U and V.

One way to find the endpoints of the vector C is by using the equation $$P + u\,U + c\,C = R + v\,V, \qquad (1)$$

which contains the scalar quantities u, c, and v and the vector quantities P, U, C, R, and V.

In addition, the vector C is subject to the constraint $$C = U \times V, \qquad (2)$$

where x is the cross-product operator. Vector equation (1) can be written as a first equation in x, a second equation in y, and a third equation in z. The vector C can be written in terms of x, y, and z components of U and V using well known cross product formulas. The x, y, and z components of C are substituted into the first, second, and third equations. The result is three equations in x, y, and z, where all of the vector quantities are known and only the three scalar quantities u, v, and c remain to be found. Since there are three equations and three unknowns, the three values can be found.

The three dimensional endpoint coordinates $Q_1$ and $Q_2$ of the line segment that join the vectors U and V along the line of closest approach are given by $$Q_1 = P + u\ U, \quad (3)$$

$$Q_2 = R + v\ V. \quad (4)$$

The best estimate Q of the intersection points of the two lines is given by $$Q = (Q_1 + Q_2)/2. \quad (5)$$

If desired, other mathematical methods can be used to find a best estimate Q of the intersection points. For example, an optimization procedure may be used to find the values of $Q_1$ and $Q_2$.

The methods above are described with respect to a laser tracker 10 having a beam of light 46 launched from a payload 15 rotating about a zenith axis 18. However, other types of mechanical steering mechanisms are possible. For example, the payload 15 may be replaced by a steering mirror. With this approach, a beam of light is directed upward from the azimuth base 16. The beam of light strikes the steering mirror and reflects out of the tracker enclosure. A motor attached to the zenith mechanical axis rotates the steering mirror to point the beam in the desired direction. In this embodiment, the payload frame of reference is replaced by the mirror frame of reference, but otherwise the analysis is the same.

It would also be possible to use one or more cameras not attached to the payload of the laser tracker. Such cameras might be attached to the azimuth carriage 14 or they might be mounted separate from the laser tracker altogether. The method for finding the relationship between the frames of reference of the cameras and the laser tracker would be found in a manner similar to that described above: some number of points would be measured by the cameras and by the laser tracker and the measurement results would be used to establish appropriate transformation matrices.

Referring again to FIG. 2, since in most cases the narrow FOV camera 58 will have a smaller angular range covered by each pixel, it is advantageous to weight the reading of the narrow FOV camera 58 more heavily. A simple way of doing this is to revise Eq. (5) above. For example, if the FOV of the narrow FOV camera 58 is one quarter that of the wide FOV camera 58, a reasonable equation to use in place of Eq. (5) above may be:

$$Q = 0.2 Q_1 + 0.8 Q_2 \quad (6)$$

Another mathematical method that may be used is a least squares optimization procedure to find the best estimate for the retroreflector target 26, but to weight the readings of the narrow FOV camera 58 more heavily than the readings of the wide FOV camera 52.

Figure 4A:
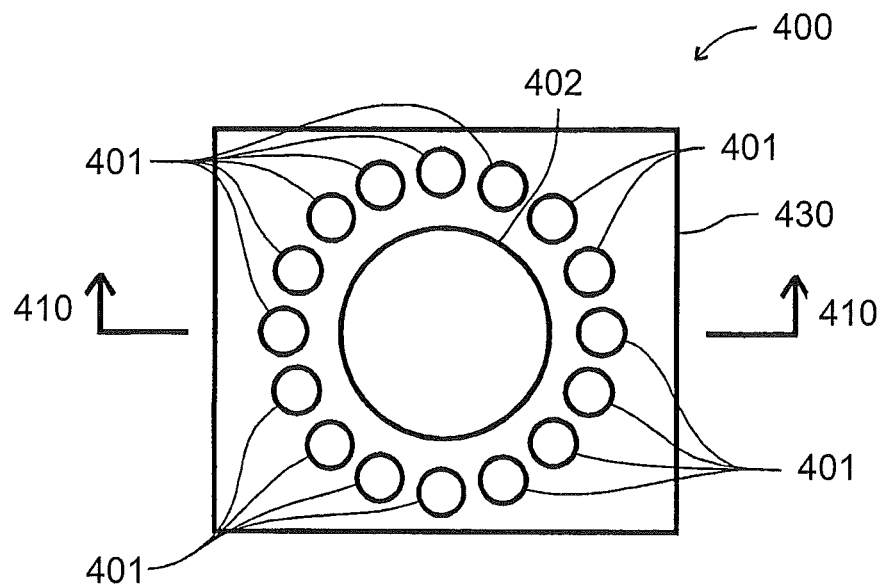
FIG. 4A is a front view of a wide-field locator camera disposed on a rigid structure portion of the laser tracker of FIG. 1 where the rigid structure is rotated to enable the locator camera to simultaneously view plural retroreflector targets.
Figure 4B:
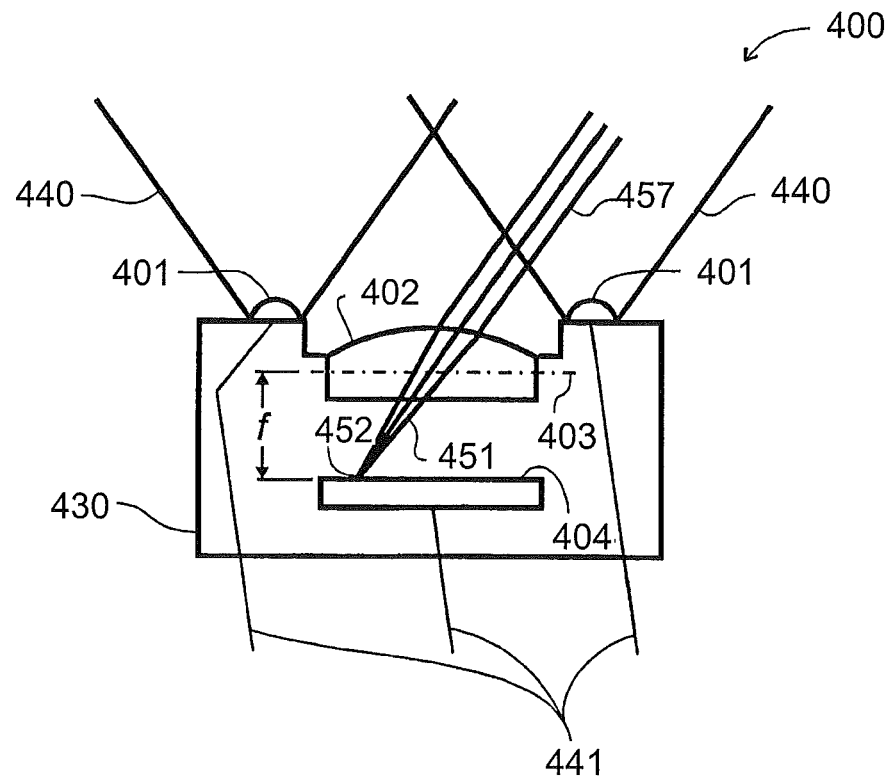
FIG. 4B is a cross sectional view of the locator camera of FIG. 4A taken along line 410-410 of FIG. 4A.

Referring to FIGS. 4A and 4B, a locator camera 400 allows the laser tracker 10 to quickly determine the approximate location of multiple retroreflectors within a relatively wide field of view of the laser tracker 10. A plurality of identical light sources 401 is provided in a ring surrounding a lens 402. Alternatively, fewer lights or even a single light may be used. The individual light sources emit overlapping cones of essentially incoherent light 440 that collectively constitute a cone of light. Each of the retroreflectors reflects some of the light from the cone of light back to the locator camera 400 as the bundles of light. One of the bundles of light 457 is shown in FIG. 4B. Lens 402 focuses the bundle 457 down to a spot on the surface of photosensitive array 404. The photosensitive array 404 is separated from the front principal plane 403 of lens 402 by the focal length f of the lens.

Electrical wires 441 provide power from a power source (e.g., auxiliary unit 50) within the laser tracker 10 to the emitters 401 and the photosensitive array 404. Electrical wires 441 also transmit the pixel data from photosensitive array 404 to general purpose computer 60, for example, for analysis. The computer 60 analyzes the pattern of light on photosensitive array 404 to determine the location of a central point 452 on photosensitive array 404. The computer 60 also performs this analysis of the pattern formed by the other bundles of light returned by the retroreflectors. In other words, the reflected light bundles are focused by lens 402 into patterns on photosensitive array 404. The computer 60 analyzes these patterns to determine the central point of each pattern. From the location of the central points, the approximate angular direction to each of the retroreflectors can be determined.

Suppose that the retroreflector of interest is a particular retroreflector among the multiple retroreflectors. If the objective is to acquire the target and measure the target positions with the laser tracker, then the following procedure may carried out. Motors are activated to turn the payload until the laser beam points in the approximate direction of a particular retroreflector. If the estimate of the target position is good enough, the light beam directly locks onto the target and begins tracking of the target. If the estimate of the target position is not good enough, one possibility is to initiate a search in which the direction of the laser beam is changed in a systematic fashion. For example, the laser beam might be steered along a spiral pattern. When the laser beam intersects the target, a position detector within the laser tracker senses the reflected light. The signals from position detector provide enough information to enable motors to point the payload directly to the center of the particular retroreflector. Another possibility is for the operator to directly grab the mechanical mechanism of the laser tracker, for example, the payload, and to manually direct the light beam toward the retroreflector of interest. In one embodiment, if the operator directs the light beam close enough to the center of the retroreflector, an LED begins to flash on the front of the tracker. If the light beam is closer still, the light beam will lock onto the retroreflector target. If the light beam is not quite close enough to the center of the retroreflector to lock onto the target, a quick search procedure may be carried out to locate the retroreflector target.

In the case that two or more locator cameras 52 are on the laser tracker 10, it is usually possible to directly establish, by means of the stereo camera calculation described hereinabove, a one-to-one correspondence between the retroreflector targets 26 and the target centers appearing on the photosensitive arrays of the cameras 52. Similarly, if a single camera 52 is located within the laser tracker in such a way that the light reflected by the targets 26 travels to the camera on an optical axis of the laser tracker, then a parallax between the camera and the camera is eliminated, and it is usually possible to establish a one-to-one correspondence between the retroreflector targets and the target centers appearing on the photosensitive array of the camera. If a single camera is used, alternative methods may be used to establish a one-to-one correspondence between the target centers and the retroreflector targets. One method involves turning the azimuth axis to different angles and observing the change in position on the photosensitive array of the single camera 52. As the azimuth angle is changed, the positions of the centers on the photosensitive array will change by an amount that depends on the distance from the laser tracker 10 to the retroreflector 26. For a given change in azimuth angle, as the distance to the retroreflector increases, the change in between the two centers on the photosensitive array decreases. A similar procedure can be carried out by changing the zenith angle, rather than the azimuth angle, of the of the laser tracker. A more detailed description of this procedure is described in reference to FIG. 18 in U.S. Patent Application No. 2011/0260033 ('033), incorporated by reference herein.

In some cases, the one or more cameras on the laser tracker are accurate enough to direct the light beam from the laser tracker close enough to the center of a retroreflector target so that the light beam reflected back into the laser tracker is picked up by the position detector, thereby causing the laser beam to begin tracking the target. In such cases, the software that controls the laser tracker may automatically direct the light beam from the tracker to each of the targets so that the relatively high accuracies of the laser tracker distance meter and angular encoders are transferred to the three dimensional coordinate values. In other cases, the one or more cameras on the laser tracker may not be accurate enough to immediately direct the light beam from the laser tracker close enough to the center of the retroreflector target to enable the position detector to immediately detect the light beam and begin tracking. In this case, the light beam from the laser tracker may be aimed at a target and the beam directed in a search pattern to locate the target, as explained hereinabove. By repeating this procedure for each of the targets within the measurement volume, relatively accurate three dimensional coordinates can be obtained for each of the target points. Relatively accurate three dimensional coordinates for the target points are important because they enable the software that controls the laser tracker to efficiently carry out automatic measurements of the target points without performing interim target searches.

As suggested by the discussion hereinabove, some aspects of this invention require the obtaining of a one-to-one correspondence between target points viewed by the one or more cameras on the laser tracker and a list of three dimensional coordinates of retroreflector target points. Some methods for obtaining a list of three dimensional coordinates of the target points are described hereinbelow. The list may, in some cases, have nominal three dimensional coordinates that differ by a relatively large amount from the actual three dimensional coordinates. In other cases, the list may have relatively accurate three dimensional coordinates.

In an embodiment, a list of three dimensional coordinates between the laser tracker and the target points on an object under test is obtained from a CAD model describing the positions of the targets on the object.

In another embodiment, the one-to-one correspondence between the target points and the list of three dimensional coordinates is obtained by performing three dimensional measurements on each of the points observed by the camera. Such three dimensional measurements may have been carried out prior to the current measurement session.

In some cases, the images of the target points on the one or more cameras may be too closely spaced to immediately determine the one-to-one correspondence between the target points and the spots on the camera images. In this case, the points may be measured with the laser tracker using the methods described hereinabove. For example, the laser tracker may direct the light beam toward the target. The laser tracker may then measure the target position directly or with the assistance of a search procedure, if necessary.

An important aspect of this invention is the establishing of a relationship between the frame of reference of the laser tracker and the frame of reference of the object under test. Another way of expressing the same idea is to say that it is important to have a method for transforming the laser tracker frame of reference into the object-under-test frame of reference or vice versa.

Three methods are taught herein for the establishing of this relationship. In a first method, at least three retroreflector target points are measured by the laser tracker. In a second method, at least two target points are measured by the laser tracker and in addition at least two angles of tilt are measured by inclinometers disposed on each of the laser tracker and the object under test. In a third method, a single six degree-of-freedom (DOF) camera is measured by a laser tracker having six DOF measurement capability. By combining the information obtained from any of the three methods, it is possible to put the laser tracker within the frame of reference of the object under test. Equivalently, it is possible to put the object under test within the laser tracker frame of reference.

A brief explanation will now be given on the method for putting the object under test into the tracker frame of reference based on the obtaining of the measured information described in the preceding paragraph. For the case in which the laser tracker measures three retroreflector target points, a local coordinate system for the object under test may be established by allowing one of the three measured points to be an origin point in the local frame of reference of the object under test, a second of the measured points to establish the x axis, and the third of the measured points to establish a component in the y direction. The y axis is taken to pass through the origin and to be perpendicular to the x axis. The z axis is taken to pass through the origin and to be perpendicular the x axis and the y axis and to have a direction according to the right-hand rule, which is known to those of ordinary skill in the art. The object under test may have its own reference coordinate system established by a CAD drawing. For example, the CAD drawing may have datums that establish an origin, x axis, y axis, and z axis. To put the CAD drawing within the frame of reference of the laser tracker, or equivalently to put the laser tracker within the frame of reference of the CAD drawing, usually three transformation matrices are obtained. Transformation matrices are usually 4×4 matrices that include a 3×3 rotation matrix and a scaling component that accounts for translations of the frames of reference relative to the other frames of reference. In the situation described hereinabove, the three transformation matrices are multiplied together in a particular order to obtain an overall transformation matrix to transform measured values or CAD values into the desired frame of reference. The use of transformation matrices is well known to one of ordinary skill in the art and will not be described further here.

For the case in which the laser tracker measures the three dimensional coordinates of at least two retroreflector target point in addition to angles of tilt of the laser tracker and the object under test, a local coordinate system for the object under test may be established by allowing a first retroreflector target point to be the local origin of the object under test and the direction from the first target point to the second target point to establish a local x axis for the object under test. If an inclinometer located on the laser tracker and the object under test each measures two perpendicular tilt angles and to the gravity vector, then it is possible to rotate the object under test to align the two gravity vectors, again using rotation methods that are well known to one of ordinary skill in the art. The ambiguity in the rotation angle about the gravity vector can be removed since there is only possible rotation about the gravity vector that provides that proper correspondence between the local x axis of the object under test and the x axis as defined by the CAD model. This method will work as long as the three dimensional coordinates of the two retroreflector target points, as measured by the laser tracker, do not form a line that coincides with the gravity vector.

Another way of viewing the transformation between frames of reference is to consider the number of degrees of freedom provided by the measured values. For example, when the laser tracker measures a first retroreflector target point, it is said to have constrained the possible movement of the object under test by three degrees of freedom because a first, second, and third degree of freedom corresponding to x, y, and z coordinates have been established for a point on the object under test. Physically, this constraint fixes the location of the measured point in space but allows the object under test to rotate in any orientation about this point. When the laser tracker measures the second retroreflector target point, it is said to have constrained the possible movement of the object under test by an additional two degrees of freedom because the object under test no longer has the ability to rotate in any of three orientational angles but instead is constrained to rotate about the line connecting the first and second retroreflector target points. Hence the three degrees of orientational freedom have been reduced to one orientational degree of freedom. The first measured point constrained three translational degrees of freedom, and the second measured point constrained two orientational degrees of freedom for a total constraint of five degrees of freedom. Since there is one unconstrained degree of freedom in this case, the total of the constrained and unconstrained degrees of freedom is six.

For the case in which inclinometers on the laser tracker and the object under test each measure two angles of tilt relative to the gravity vector and the laser tracker measures the three dimensional coordinates of just one target point, there is not enough information to fully constrain the object under test. The two inclinometers constrain two angles but provide no information on rotation of the object under test about rotation about the gravity vector. In other words, the two inclinometers constrain two degrees of freedom. The three dimensional coordinates of the single target measured by the laser tracker provides constraint of three degrees of freedom, for a total constraint of five degrees of freedom. Since six degrees of freedom are needed for complete constraint, the measured values do not provide complete constraint, and the object is free to move around the gravity vector.

For the case in which inclinometers on the laser tracker and the object under test each measure two angles of tilt relative to the gravity vector and the laser tracker measures the three dimensional coordinates of two target points, there is enough information to fully constrain the object under test as long as the two target points do not establish a line along the direction of the gravity vector. By performing this measurement, the object under test is said to be constrained in six degrees of freedom as long as the two target points do not lie along the direction of the gravity vector.

For the case in which the two vectors lie along the gravity vector, the object under test is said to be constrained by five degrees of freedom since there is not enough information to determine the orientation of the object under test about the gravity vector. Note that the number of degrees of freedom cannot be determined by simply adding the number of degrees of freedom that would be obtained by individual measurements. For example, measurement of a single point constrains three degrees of freedom, but the measurement of two points constrains five degrees of freedom, not six degrees of freedom. Also notice that the two angular degrees of freedom provided by the inclinometers on the laser tracker and the object under test do not add to the five degrees of freedom obtained by the laser tracker measurement of the two retroreflector target points to obtain six or seven degrees of freedom. This is because the two degrees of freedom provided by the inclinometers do not correspond to a basis set that is independent of the basis set of the two target points measured by the laser tracker. In other words, complete constraint of a single rigid body requires constraint of three translational degrees of freedom (e.g., x, y, z) and three orientational degrees of freedom (e.g., pitch, roll, and yaw angles). In the case considered above, there is no constraint for rotation about the gravity vector (often called the yaw angle). In this application, the term degrees of freedom should be understood to mean independent degrees of freedom.

It should be understood that the targets viewed by the cameras on the laser tracker may be in a region beyond the field of view (FOV) of the cameras by rotating the azimuth and zenith axes of the laser tracker. For example, the FOV of one of the cameras on the laser tracker may be 30 degrees in the azimuth direction. However, the azimuth axis of the tracker may be rotated by 360 degrees, thus increasing the effective FOV of the camera to 360 degrees.

Embodiments of the present invention allow an operator with limited training on the measurement system (e.g., laser tracker, target tooling, SMRs or other laser tracker targets, computer system, measurement system software and optionally a remote control or handheld device connected to the measurement software) optionally to follow a series of prompts and instructions via a computer (e.g., the general purpose computer 60) to set up the laser tracker, optionally to place the SMRs in the required tooling on the part to be measured, and optionally to define the area of interest to be measured. The measurement system may then automatically measure the target points and produce the results.

An embodiment of the present invention that helps enable simpler and faster measurements for the operator is a method in which the laser tracker points the light beam at a desired measurement location on the object to prompt the operator to place an SMR at the desired location. For example, the operator might be prompted to place a retroreflector target in a magnetic nest on an object under test. As another example, a retroreflector may be located in the wrong position, and the operator may be prompted by the light beam from the laser tracker to move the misplaced target to the correct location. The prompting might do this, for example, by moving the light beam sequentially from a first position containing the misplaced target to a second position where the target is to be placed.

The guidance given by the light beam from the laser tracker may also have an advantage during a setup phase in which the operator places SMRs in specified locations while the laser tracker measures the three dimensional coordinates of the target positions. This advantage is seen when the nominal dimensions given on a CAD model do not correspond to the actual dimensions of an object under test. If the accurate three dimensional locations of the target points are determined during setup, measurement time and errors occurring later in the process may be decreased.

The directing of the actions of the operator by pointing of the light beam can help eliminate errors. For example, a test plan within software for a laser tracker test may indicate that the operator is to measure points in a particular order. The results of such measurements may be saved and used to obtain a desired relationship—for example, a relationship between two frames of reference, a length between two lines, or the angle between two planes. If the operator has measured the initial points in the wrong order or has measured the wrong points, then the software may fail to solve for the desired values or get the wrong answers.

In the cases described thus far, the operator is directed to place a retroreflector target in a fixed location, which might be a magnetic nest or a tooling hole, for example. However, there is another important case in which the operator measures a surface profile. Such a surface profile might be measured to determine the flatness of a surface or the diameter of a sphere, for example, or two surfaces might be measured to determine the angle between the surfaces. As another example, an operator might measure a portion of a tool being built for use in assembling automobiles or airplanes. The laser tracker might be used to measure the surface profile to see whether the profile is within the design tolerances. If not, the operator might be directed to modify the tool in an appropriate manner—perhaps by abrading material from a region, for example. In all of these cases in which the SMR is used to measure the profile of a surface, the software that controls the laser tracker may greatly simplify and speed the procedure by the operator by indicating the region that is to be scanned. It may do this by causing the laser tracker to direct the light beam to delimit the areas the operator is to scan. Alternatively, it might trace the actual path the operator is to follow during the scan.

The laser tracker may also be used to assist in the assembly of complex structures. For example, it may be necessary to affix a number of components to the cockpit of an aircraft. In many cases, a cost effective way to do this is to point a light beam to instruct the assembler to drill holes or perform other operations at the appropriate locations. After the components have been attached, the operator may be instructed to scan the profile of the installed items to confirm that the installation has been made properly. To facilitate this measurement, one or more cameras may be used to identify retroreflectors on the object under assembly. These retroreflectors would be used to move the laser tracker into the frame of reference of the object under assembly, which would then enable the laser tracker to direct the activities of the assembler using the light beam from the tracker.

The one or more cameras on the laser tracker have the ability to measure all of the retroreflector targets within a large effective FOV by rotating the azimuth and zenith axes, as explained hereinabove. If the only targets accessible to the laser tracker are those on the object under test, the laser tracker can automatically determine, by viewing the retroreflector targets, the region of space to be measured. On the other hand, if targets occupy several objects, not all of interest to the current measurement, it may in some cases be necessary for the operator to indicate the region that is to be measured. In an embodiment, the operator may indicate the region to be measured by using a retroreflector to delimit the region of interest. The operator may do this, for example, by making four consecutive movements of the retroreflector target to indicate the upper, lower, left, and right extent of the region. In another embodiment, the operator may manually move the payload (or equivalent structure) of the laser tracker to point the light beam in the upper, lower, left, and right edges of the region of interest. The operator may be instructed to carry out these movements by software that controls the laser tracker, or the operator may give gestures to give this information without being directed to do so by the computer program. Such gestures may include, for example, movement of a retroreflector target in predetermined patterns within specified time intervals. As another example, the operator may indicate the desire to delimit a region by grabbing the payload and moving the light beam from the laser tracker directly downward. The operator could follow this initial movement by moving the payload to delimit the upper, lower, left, and right edges of the desired measurement region. In other cases, it may be possible for the software that controls the laser tracker to perform a target matching procedure in which the software identifies a collection of retroreflector targets in correspondence to a CAD model or to a list of three dimensional coordinates of targets.

In discussions above, the benefits of having the laser tracker using the light beam to assist the operator in performing measurements has been emphasized. Now the benefits of completely automating a measurement are considered. One potential benefit is that, because of the speed with which a fully automated measurement can be performed, additional targets may be added to the object under test without increasing the test time. By providing more points in each set of data, the software may more quickly determine the desired geometrical characteristics of the object under test with fewer potential errors. Also, by measuring sets of points without having the user manually move the SMR, the chance of having the object get shifted during the measurement session are reduced. This in turn reduces the chance of measurement errors.

A potential advantage of a fully automated measurement is that the order in which measurements are made can be optimized. In the case in which there are a large number of target positions on an object under test, an operator may measure the target positions according to relative proximity of the points since this is the fastest procedure for manual measurement. In a fully automated procedure, on the other hands, measurements may be performed in an order which produces the most accurate and robust measurement results. For example, two points on a datum line may be on opposite sides of a large object under test. An automated test procedure can measure these widely separated datum points one after the other, thereby avoiding drift and getting the most accurate measurement results.

Another potential advantage of automatic measurement is the possibility of automatic refit. It is often desirable to periodically measure the characteristics of tools used in the manufacture of products. Such periodic measurements help ensure that the tool has not gotten bent, that the targets have not moved, and so forth. If an object under test has gotten bumped, then during a periodic measurement this will be noticed by the software that controls the laser tracker. The software may in response invoke an automatic refit procedure in which the new location of the bumped target is re-established. The automatic refit procedure may also reduce the requirement for rigid mounting to hold the object rigidly on the tool. Reduced rigidity requirements results in reduced costs for building and operating a very accurate, repeatable tool.

Another example of automatic refit is for the case in which the object under test is on an assembly line. Such an object will probably not be in exactly the same location after it has completed a circuit and has returned to the laser tracker for an inspection. The laser tracker can measure the reference points to re-establish the relationship the frame of reference of the laser tracker and the frame of reference of the object under test.

One capability made possible by the automated measurements described above is the setting of a desired accuracy value, possibly by the user, to drive specific operations and set thresholds for alerts and alarms. For example, the value set for desired accuracy can drive: (1) the frequency and tolerance on stability checks; (2) self-compensation versus full pointing comp requirement; (3) the frequency and tolerance of self-compensation; (4) the threshold for number of measurement samples per point measured; (5) ambient temperature change limits before compensation checks; (6) tolerance for acceptable results of alignments and position moves; and (7) the frequency and tolerance of drift checks.

Alternatively, each of these values can be set individually. A matrix of values can be set based on different applications and operating conditions and these could be saved and recalled as measurement profiles.

An example is now considered in which a setup procedure includes cooperation by the operator rather than complete automation. For the desired measurement locations, the laser tracker 10 aims at a desired position on the object to place an SMR. In a first embodiment, the operator holds the SMR in hand while placing the SMR in the light beam, thereby enabling the beam to lock onto the SMR. After the SMR is put onto the object (e.g., on a magnetic nest), the laser tracker measures the three dimensional coordinates and moves the light beam to the next target position. In a second embodiment, the operator places the retroreflector immediately on the object, which might be on a magnetic nest, for example. If the light beam does not immediately lock onto the retroreflector, the operator gives a signal by, for example, passing a hand in front of the retroreflector target, thereby causing the target to flash in the view of the camera. The tracker searches for the SMR and quickly measures the SMR location. The tracker then advances to the next nominal point to guides the operator as to where to place the target on the object. A third embodiment is like the second embodiment except that the laser tracker does not do a search if the target is not immediately found. Instead, when the operator passes a hand in front of the retroreflector target, the laser tracker directs the light beam to the next target location. During an initial setup, it may be acceptable to make all of the measurements relatively quickly by limiting each measurement time to about 0.1 second, for example.

A large number of retroreflector targets, which may exceed 100, may be used to measure points on a tool. In some instances, the operator may wish to put on only a portion of the retroreflectors at a time (e.g., 25 retroreflectors at time) to save money on the purchase of retroreflectors. A measurement cycle is defined as the cycle over which the available retroreflector targets (e.g., 25 targets) are located on the tool and measurements are performed by the laser tracker.

If the SMRs are not already affixed to the object under test, the operator places the SMRs on the object either manually or by using the guidance provided by the laser tracker 10. The tracker may then conduct a stability and reference system check. The stability check may be conducted by measuring one or more points. In an embodiment, the tracker measures two or more points at the extreme boundaries of the measurement volume along with one point nearest the center of the volume. The laser tracker 10 automatically takes a series of points with shorter and progressively longer duration (more samples) to determine the optimal number of samples to achieve the desired accuracy (the operator sets this number in the system). The systems setting for samples per point are set to this value. The system will have the option to recheck the stability after a certain period of time, a number of points measured or at the beginning and/or end of each cycle. After the reference points (minimum of three) have been measured the first time, they can be re-measured at the end of the cycle to check movement or at the beginning of each cycle to re-orient the laser tracker to the part to correct for any movement of the object that may have been introduced by the operator while moving the SMRs. A simpler and faster method for checking possible movement is to place a single point on the object and a second point somewhere else; e.g., on the floor. These positions will have SMRs in them all the time and the measurement system can periodically check them throughout the measurement session. One way is to check at specific intervals during the measurement session in addition to the beginning and end of each cycle. A minimal implementation would to measure these drift points at the beginning and end of each measurement session.

The measurement system automatically measures all of the required points per the system settings. The laser tracker's user lights can flash a pattern of LEDs after each point is measured to alert the operator as to a passing or failing point. If a point fails, the operator can pause the automatic measurements by waving a hand in front of any target in the tracker's FOV. The camera system will register the break in the flashing of a single target produced in response to the flashing light source 54 and pause the measurements. The operator can hold a hand in front of the out-of-tolerance point so that it can be adjusted. The laser tracker then aims at the desired point. A digital readout guides the operator to adjust that portion of the tool that is out of tolerance. When the adjustment is complete, the operator may give another gesture (e.g., moving a hand in front of the SMR) to command the laser tracker to re-measure the point and continue measuring the rest of the points. By either flagging the SMR or physically moving the azimuth or zenith axis of the systems, it will be possible to execute the full measurement process so that the operator does not need to use a remote control, mouse or keyboard.

Figure 5A:
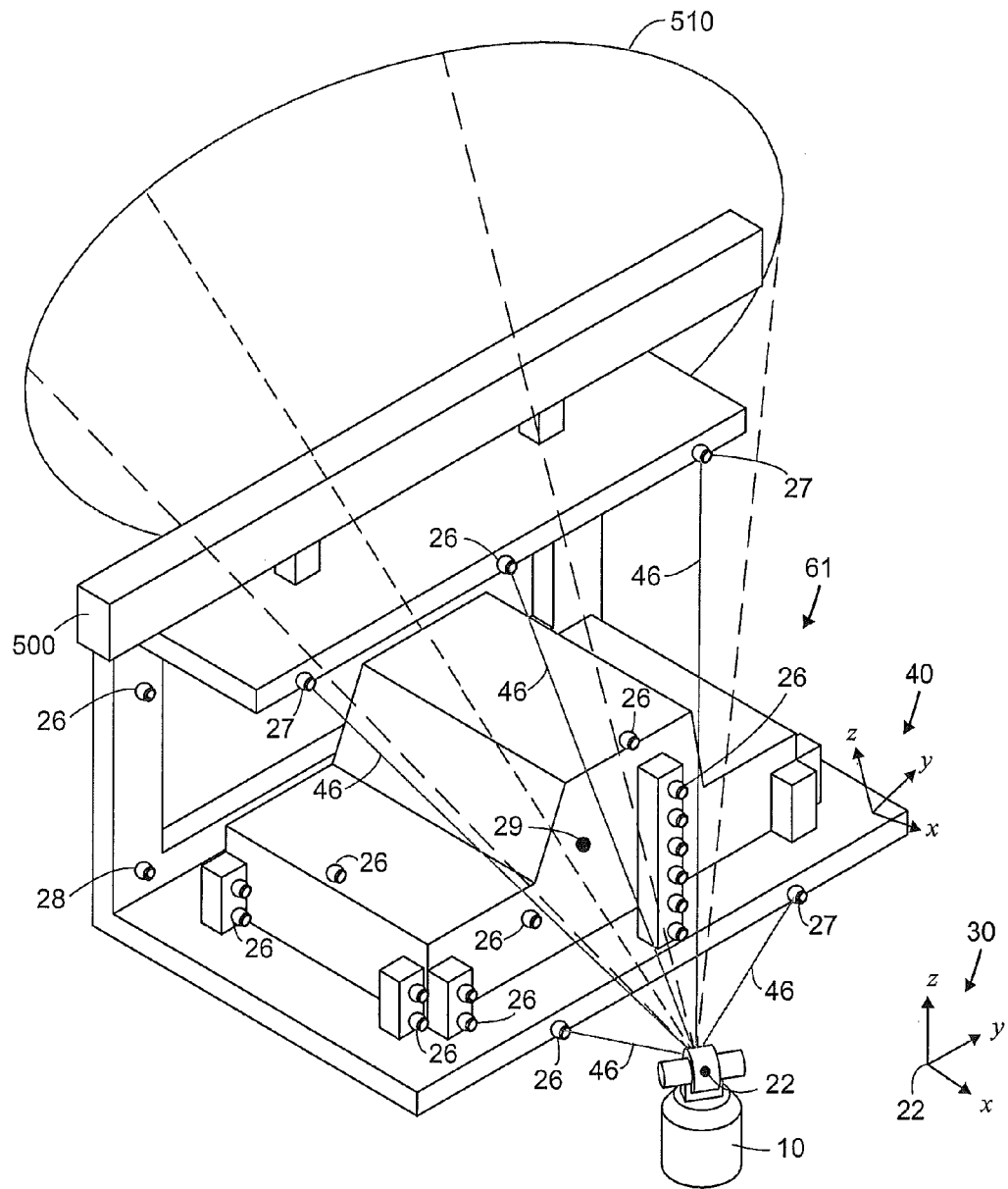
FIG. 5A is a perspective view of the laser tracker of FIG. 1 in a first orientation with respect to an object to be measured with the laser tracker automatically taking measurements of various target points on the object.
Figure 5B:
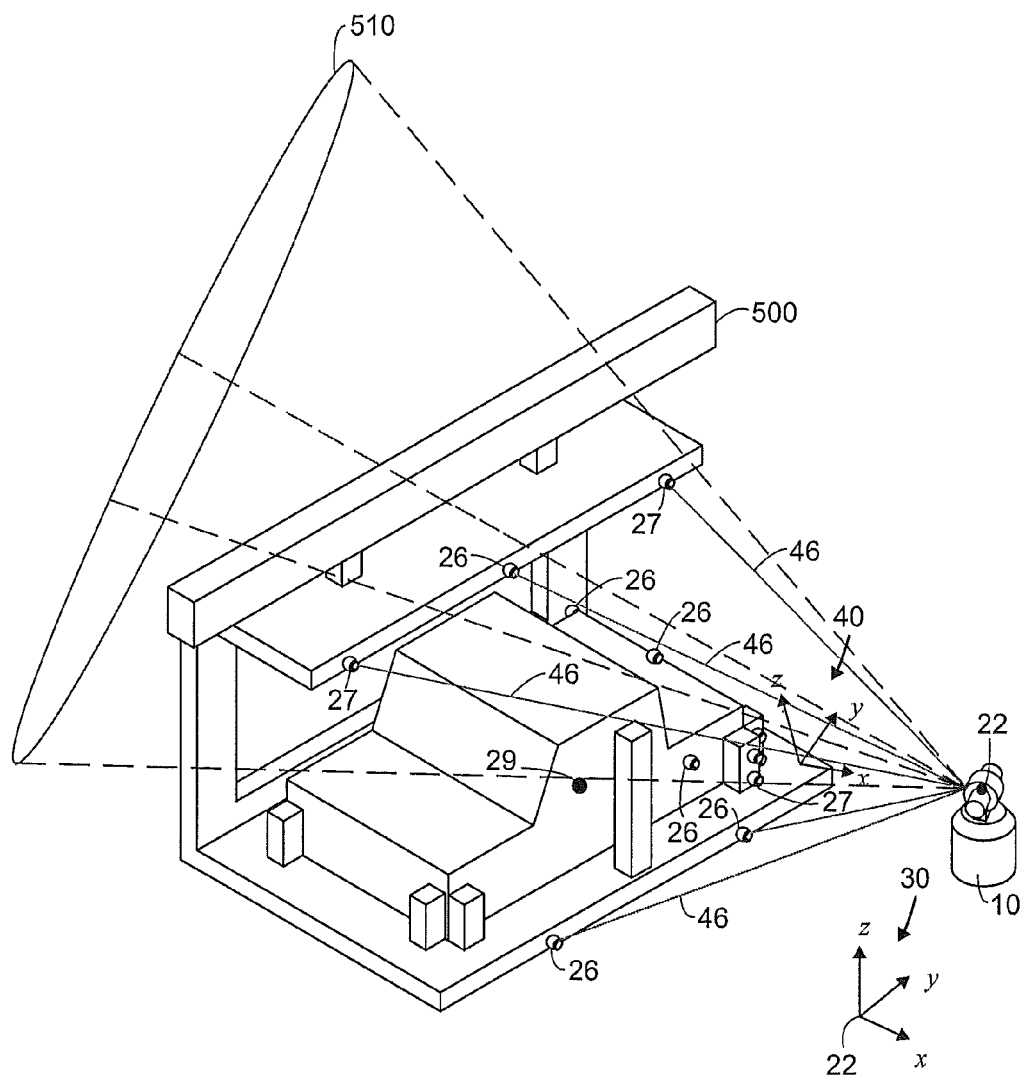
FIG. 5B is a perspective view of the laser tracker of FIG. 1 in a second orientation with respect to an object to be measured with the laser tracker automatically taking measurements of various target points on the object.
Figure 6:
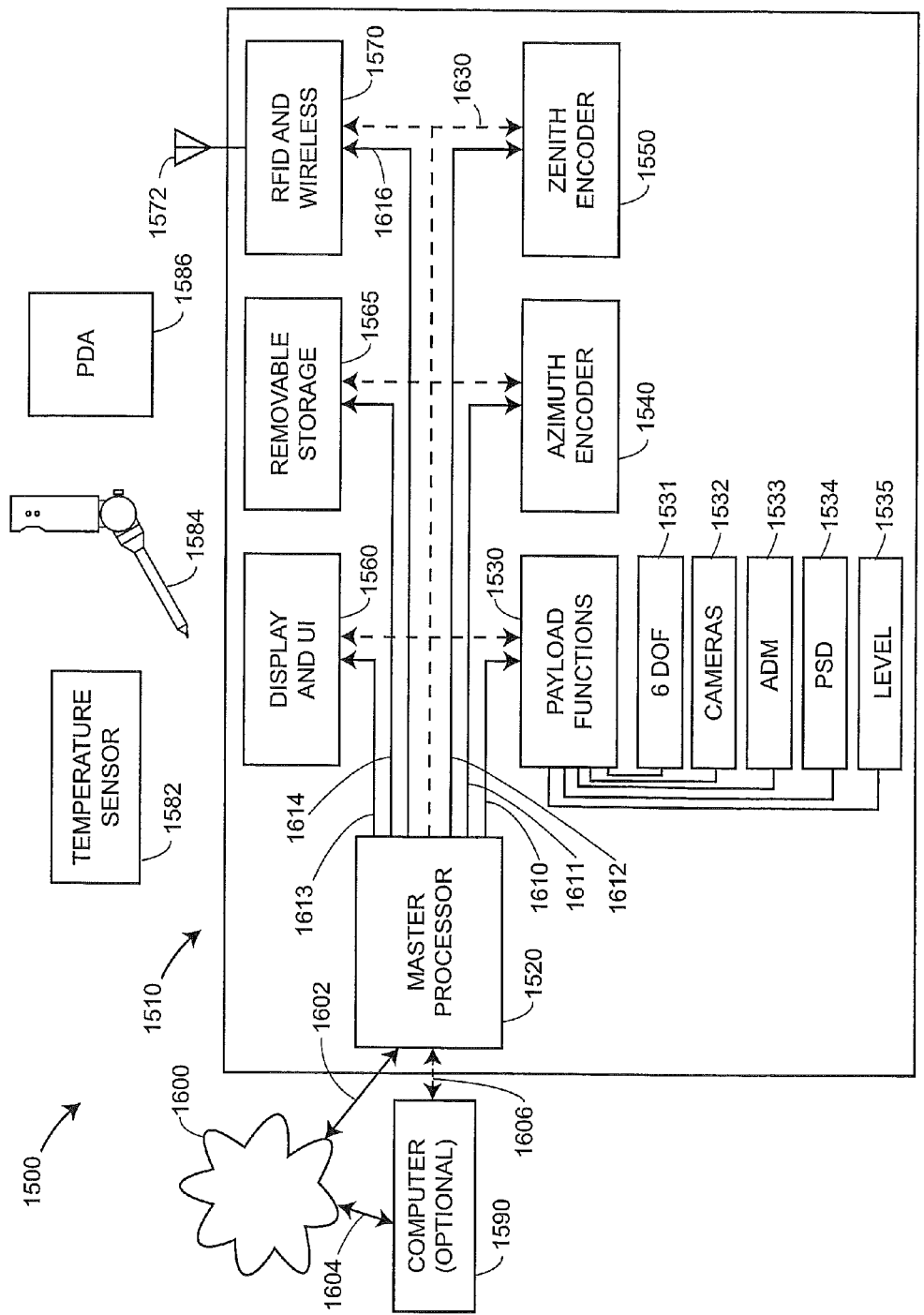
FIG. 6 shows electronic processor elements within a laser tracker according to an embodiment.

Referring to FIGS. 5 and 6, there illustrated are perspective views of the laser tracker 10 of FIG. 1 or 2 in first and second orientations, respectively, with respect to an object 500 to be measured with the laser tracker 10 automatically taking measurements of various target points 26 (e.g., SMRs 26) on the object 500. The object 500 can be any type of relatively large object, such as a carriage that is part of an assembly line for automobiles. However, this is purely exemplary; the object 500 can be any type of tooling or finished product. As discussed hereinabove, the object 500 has multiple target points 26, for example SMRs 26, placed on the object 500 at various locations in accordance with embodiments of the present invention. SMRs may also be placed on the assembly being held by the object 500.

FIG. 5A illustrates a number of SMRs 26 at various locations on the object 500. Also shown is the laser tracker 10 having its laser beam 46 pointed at a number of these SMRs 26. In addition, a cone 510 illustrated that represents the field of view of the one or more cameras 52, 58 of the laser tracker 10 as the camera(s) are viewing a portion of the object 500.

FIG. 5B is similar to FIG. 5A but now the laser tracker 10 is turned with respect to the object 500 and also some of the SMRs 26 on the object 500 at specific locations in FIG. 5A have been moved to other locations on the object 500 in FIG. 5B. Also, the cone of the field of view of the camera(s) 52, 58 is in a different orientation with respect to the object 500. This enables the camera(s) 52, 58 to capture other additional target points 26 on the object 500. The movement of the target to two different positions may be achieved in either of two ways. In an assembly line, the carriage may move a short amount to allow the change in laser tracker perspective as seen in FIGS.

5 and 6. For a stationary tool, the laser tracker may be moved to enable measurement of points that might be otherwise hidden from view.

Due to the size of the object 500 being measured and the accuracies that may be desired, the ambient temperature of the object 500 could become a source of measurement error if not addressed. For example, metal structures may expand as they get warmer. Also, the nominal values of the object (e.g., the CAD file) are often set at the temperature of a controlled room in the range of 20 degrees C. or 68 degrees F. If the object being measured is warmer than this it will be physically larger. It is common practice to adjust for this difference by applying a scale factor to the measurement job and adjusting the measurement data back to the design temperature by knowing the part material and temperature or by measuring reference points and applying a scale factor when transforming the job.

In an automated measurement session, where reference points 26 are being used and measured, the operator may indicate by a setting in the software to always apply a scale factor when transforming the job. The problem with this practice is that if the geometry of the object is changed, bent, etc., the automatic scale method will reduce this error by changing the scale of the job. A second method may be to use a material sensor placed on the object and have the operator enter the coefficient of expansion or material type and the system can determine scale based on these inputs. However, a preferred method by which an automated system may operate is to compare the two methods and alert the operator if any variation exceeds the desired system accuracy. The operator would place one or more material sensors on the object. The system can check the ambient temperature via an internal tracker sensor or an external sensor. If the difference is great enough to cause the part to expand or contract during the measurement session, the system would alert the operator to allow the object to soak in the environment and delay the measurement until the object temperature stabilizes. The measurement job may include the material type and/or the coefficient of expansion of the material. The system measures the reference points on the object and compares their values to nominal or desired values.

During the transformation process the system calculates the scale factor based on the transformation of measured to nominal and calculates scale based on the material type and material temperature sensor. If there is an unacceptable difference between the two scale calculations the operator will be alerted and the measurement session is halted. This difference may indicate that one of the following conditions has happened and the system may not be able to measure the job as expected; (1) the material temperature sensor(s) and/or the air temperature sensor(s) may be defective and producing the wrong values; (2) or the more common cause may be that the object is geometrically deformed to the point where the reference points 26 are no longer at the design location on the object. This is relatively difficult to detect in current measurement sessions as the automatic scaling tends to hide these errors and introduce uncertainties or errors across the entire job. If the reference points have errors, traditionally the entire job will be shifted slightly off nominal and this can cause some points to fail incorrectly. If the highest accuracy is desired, additional checks can be performed by the system during the measurement session to minimize expansion or contraction of the part.

The relatively most automatic system may be to use the stereo cameras 52 on the laser tracker 10 to determine depth and position to estimate the location of the SMRs 26. In an embodiment, the operator places the SMRs 26 on the object 500 and manually aims them in the direction of the laser tracker 10. The operator indicates the desired measurement volume by manually moving the azimuth and zenith axes of the tracker 10 to the relatively extreme points of the measurement volume as prompted by the software. The software prompts the operator to move the tracker head and laser beam 46 to the furthest right point; the operator then moves the tracker head. When the movement is stable for a specified amount of time (e.g., two seconds), the system records the location. The software prompts the user to move the tracker head to the furthest left, top and bottom of the intended volume.

If the indicated volume exceeds the range of the widest field of view of the camera system 52 on the tracker 10, the tracker then executes a programmed sweep/survey of the entire volume looking for SMRs 26 or targets. This programmed sweep/survey will be repeated as required throughout the measurement session to monitor the status of the SMRs or look for user input to the system. Using the stereo cameras 52 the laser tracker 10 estimates the XYZ location for every point within the measurement volume. The measurement system software calculates a first approximation on the transformation between the tracker and the set of points. The tracker then aims at the desired points. If any points are not visible from the measurement set, the tracker 10 flashes an error with the LEDs on the front of the tracker (not shown) and then aims at the location where the target 26 is missing, miss-aimed or obscured by another object. The tracker can move in a fixed pattern to make the location more visible for the operator. Once the point is corrected, the operator can flag the SMR 26 and the system will know to measure the location and proceed with the process. Again automatically, the tracker 10 aims at and uses the camera system 52 or traditional search system to lock onto and measure each target 26.

As stated in the previous paragraph, when pointing a light beam toward a target location, it can sometimes be a good idea to move the light beam in a pattern rather than pointing it at a fixed angle. Consider, for example, the case in which a magnetic nest is located off the top of an object under test. In this instance, a light beam pointed directly toward the target location (i.e., the center of the retroreflector target when placed in the magnetic nest) may be invisible to the operator since it may pass by the object without striking anything in its path. By moving the light beam in a pattern, the desired position of the SMR can be made visible.

If the laser tracker 10 is equipped with one or more wide field of view (WFOV) cameras and one or more narrow field of view (NFOV) cameras, the system can locate the general position of the SMR 26 with the WFOV camera and aim at the point 26. If the laser beam 46 does not hit the center of the target 26 close enough to enable the tracking system to lock onto the target, one or more of the following processes can be executed. (1) The tracker can reevaluate the position from the WFOV camera(s) and aim again at the stationary point. (2) The tracker can switch to the NFOV camera(s) and recalculate the optical center of the target and aim at this calculated center and attempt to acquire the target with the tracking system. (3) If the tracker is equipped with an optical zoom function on the NFOV camera(s) and the NFOV camera(s) cannot see the target after changing from the WFOV cameras (the WFOV position calculation caused the tracker to aim at a position that has enough error that the NFOV camera(s) cannot see the SMR), the NFOV camera can zoom out to the point where the target is visible and then calculate the optical center and properly aim the tracker.

Any of these processes can be repeated until the target is re-acquired, the advantage is that using the combination of the WFOV and NFOV cameras (referred to as the camera system herein) can be faster than the traditional aim and search method using the laser beam and position sensor.

In other embodiments of the present invention, another measurement procedure may be to compare, under the direction of software, measurement results to allowable tolerances. The laser tracker 10 may compare the nominal (CAD model) dimensions between target points on a tool and the dimensions as measured by the laser tracker. If the error between a nominal dimension and a measured dimension exceeds a tolerance value, the tracker may take action. This action may be as simple as re-measuring the points or measuring the points for a longer time. The tracker may also perform a two-face measurement to ensure that the problem is not with tracker accuracy. In the alternative, the action taken by the tracker may be to send the operator an error message, sound a beep, flash a light, or even shut down the production line until the operator checks the stability, makes an adjustment, or replaces a defective target, for example.

Embodiments of the two-face test are described in U.S. Pat. No. 7,327,446 ('446) to Cramer et al., which is incorporated by reference in its entirety. The tracker 10 makes a two-face measurement of one or more target points 26. If the two-face error obtained exceeds the specified value (for example, as given in the manufacturer's data sheet), a further step might be for the tracker to carry out a compensation procedure to improve tracker performance. There are two types of compensation procedures that are most commonly carried out (although other procedures are possible). These two procedures are the self-compensation procedure described in the '446 patent and the pointing compensation procedure. The pointing compensation procedure includes making a number of two-face measurements by pointing at targets that may be mounted on the floor, on pedestals, or on an object. After collecting the data from the pointing compensation, the tracker automatically corrects its internal parameters, thereby improving its measurement accuracy.

Another measurement procedure might be to check for stability of measurements over time. For example, the tracker may measure a target point on a floor and another target point on the tool. If the relative positions of these two target points change over the course of a measurement, the tracker may send the operator a warning. Similarly, the tracker may measure the distance between three points on a tool, and then come back at the end of the measurement and measure these three points again. If the relative positions of these points change, the validity of the entire measurement is called into questions, and additional measurements may be required.

Although the discussion has mostly treated the case in which the one or more cameras are located on the payload of the laser tracker, it will understood by one of ordinary skill in the art that such cameras may be located internally to the laser tracker (e.g., coaxial with the optical axis of the laser tracker), located on the azimuth carriage 14 of the laser tracker 10, or entirely off the laser tracker.

FIG. 6 is a block diagram depicting a dimensional measurement electronics processing system 1500 that includes a laser tracker electronics processing system 1510, peripheral elements 1582, 1584, 1586, computer 1590, and other networked components 1600, represented here as a cloud. Exemplary laser tracker electronics processing system 1510 includes a master processor 1520, payload functions electronics 1530, azimuth encoder electronics 1540, zenith encoder electronics 1550, display and user interface (UI) electronics 1560, removable storage hardware 1565, radio frequency identification (RFID) electronics, and an antenna 1572. The payload functions electronics 1530 includes a number of subfunctions including the six-DOF electronics 1531, the camera electronics 1532, the ADM electronics 1533, the position detector (PSD) electronics 1534, and the level electronics 1535. Most of the subfunctions have at least one processor unit, which might be a digital signal processor (DSP) or field programmable gate array (FPGA), for example. The electronics units 1530, 1540, and 1550 are separated as shown because of their location within the laser tracker. In an embodiment, the payload functions 1530 are located in a payload, while the azimuth encoder electronics is located in the azimuth assembly and the zenith encoder electronics 1550 is located in the zenith assembly.

Many types of peripheral devices are possible, but here three such devices are shown: a temperature sensor 1582, a six-DOF probe 1584, and a personal digital assistant, 1586, which might be a smart phone, for example. The laser tracker may communicate with peripheral devices in a variety of means, including wireless communication over the antenna 1572, by means of a vision system such as a camera, and by means of distance and angular readings of the laser tracker to a cooperative target such as the six-DOF probe 1584.

In an embodiment, a separate communications bus goes from the master processor 1520 to each of the electronics units 1530, 1540, 1550, 1560, 1565, and 1570. Each communications line may have, for example, three serial lines that include the data line, clock line, and frame line. The frame line indicates whether or not the electronics unit should pay attention to the clock line. If it indicates that attention should be given, the electronics unit reads the current value of the data line at each clock signal. The clock signal may correspond, for example, to a rising edge of a clock pulse. In an embodiment, information is transmitted over the data line in the form of a packet. In an embodiment, each packet includes an address, a numeric value, a data message, and a checksum. The address indicates where, within the electronics unit, the data message is to be directed. The location may, for example, correspond to a processor subroutine within the electronics unit. The numeric value indicates the length of the data message. The data message contains data or instructions for the electronics unit to carry out. The checksum is a numeric value that is used to minimize the chance that errors are transmitted over the communications line.

In an embodiment, the master processor 1520 sends packets of information over bus 1610 to payload functions electronics 1530, over bus 1611 to azimuth encoder electronics 1540, over bus 1612 to zenith encoder electronics 1550, over bus 1613 to display and UI electronics 1560, over bus 1614 to removable storage hardware 1565, and over bus 1616 to RFID and wireless electronics 1570.

In an embodiment, master processor 1520 also sends a synch (synchronization) pulse over the synch bus 1630 to each of the electronics units at the same time. The synch pulse provides a way of synchronizing values collected by the measurement functions of the laser tracker. For example, the azimuth encoder electronics 1540 and the zenith electronics 1550 latch their encoder values as soon as the synch pulse is received. Similarly, the payload functions electronics 1530 latch the data collected by the electronics contained within the payload. The six-DOF, ADM, and position detector all latch data when the synch pulse is given. In most cases, the camera and inclinometer collect data at a slower rate than the synch pulse rate but may latch data at multiples of the synch pulse period.

The laser tracker electronics processing system 1510 may communicate with an external computer 1590, or it may provide computation, display, and UI functions within the laser tracker. The laser tracker communicates with computer 1590 over communications link 1606, which might be, for example, and Ethernet line or a wireless connection. The laser tracker may also communicate with other elements 1600, represented by the cloud, over communications link 1602, which might include one or more electrical cables, such as Ethernet cables, and one or more wireless connections. An example of an element 1600 is another three dimensional test instrument—for example, an articulated arm CMM, which may be relocated by the laser tracker. A communication link 1604 between the computer 1590 and the elements 1600 may be wired (e.g., Ethernet) or wireless. An operator sitting on a remote computer 1590 may make a connection to the Internet, represented by the cloud 1600, over an Ethernet or wireless line, which in turn connects to the master processor 1520 over an Ethernet or wireless line. In this way, a user may control the action of a remote laser tracker.

Figure 7:
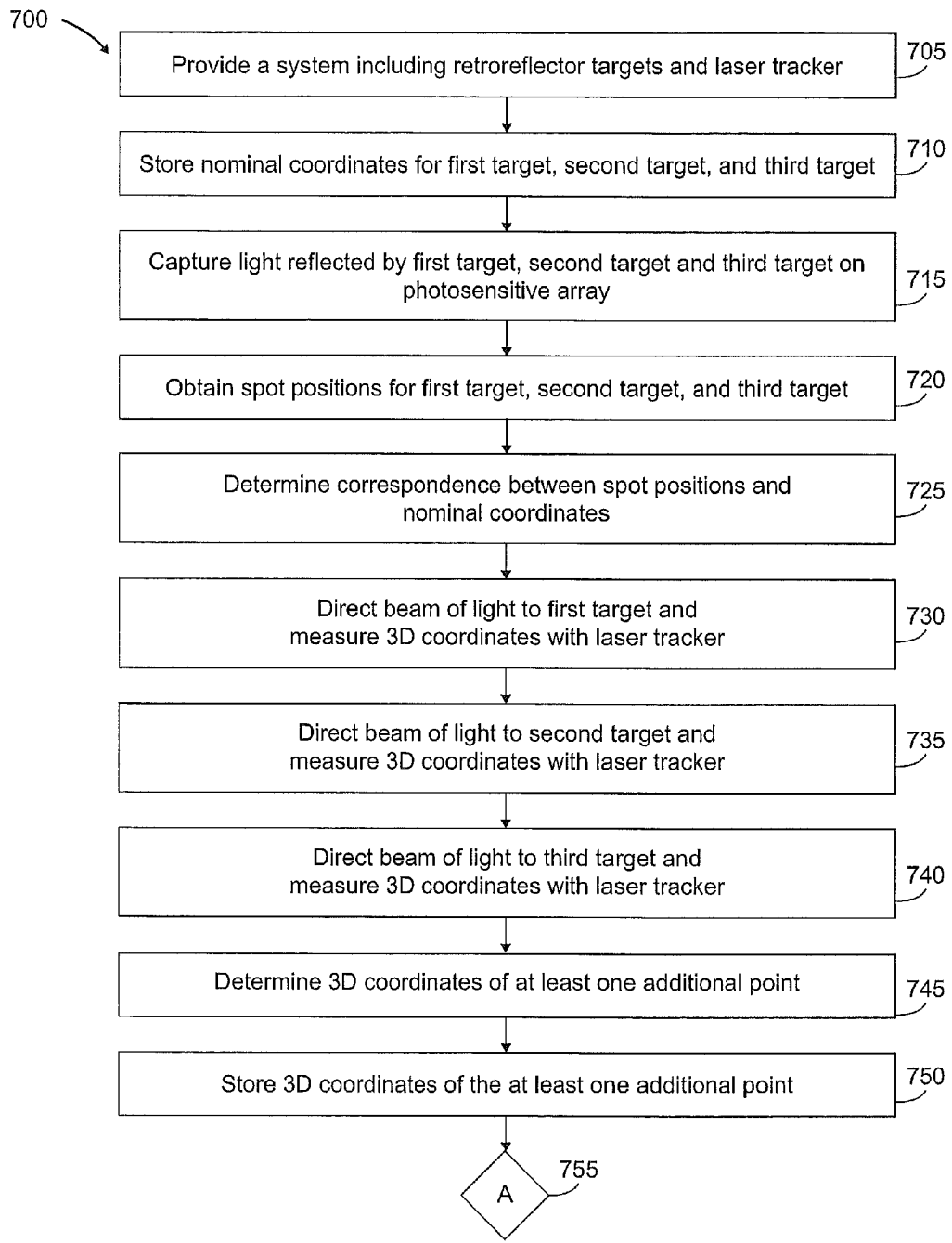
FIG. 7 is a flow diagram showing steps in measuring with a system according to an embodiment.

FIG. 7 is a flow diagram showing steps 700 in an embodiment for measuring with a system. Step 705 is to provide a system that includes a collection of retroreflector targets and a laser tracker. The collection of retroreflector targets include at least three retroreflector targets, a first target, a second target, and a third target, those targets not aligned in a straight line. The laser tracker is in a first frame of reference, which is shown in FIGS. 1, 5, and 6 as a frame of reference 30. In an embodiment, the origin of the frame of reference of the laser tracker is at a gimbal point 22 of the laser tracker. The x, y, and z axes of the first frame of reference are fixed with respect to the tracker surroundings, but are usually referenced to tracker characteristics such as directions of rotation. The laser tracker includes a structure, a first light source, an absolute distance meter, a first angular transducer, a second angular transducer, a tracking system, a first camera, a second light source, and a processor. The structure is rotatable about a first axis and a second axis. In an embodiment, the first axis is an azimuth axis and the second axis is a zenith axis. In an embodiment, the structure is a payload that holds optical components. In another embodiment, the structure is a mirror that deflects light to send the light out of the laser tracker in a desired direction. The first light source, which produces a first light beam, may be a laser, a superluminescent diode, or another type of light source. The absolute distance meter cooperates with the first light source to measure an absolute distance. The light from the first light source may be used to measure the time taken for the light, traveling at the speed of light through air to a retroreflector target and back to the tracker. The method of measuring the time of flight may include a phase-measurement method, a pulsed time-of-flight method, or any other type of absolute distance measurement method. In an embodiment, the first and second angular transducers may be angular encoders that measure azimuth and zenith angles. The tracking system is used to keep the first light beam centered on a retroreflector target. A retroreflector has a position about which a beam of light reflects. For example, in a cube-corner retroreflector, light reflects symmetrically about the vertex of the cube corner, which is the point about which the three mutually perpendicular surfaces intersect. In many cases, the point at which light reflects symmetrically is centered in a sphere. For example, in a type of spherically mounted retroreflector, the vertex of an open-air cube corner is placed at the center of a steel sphere. In this case, the tracking system of the laser tracker keeps the first beam of light centered on a center of the retroreflector target. However, a retroreflector target is not necessarily centered in a sphere. Rather a retroreflector may be directly attached to an object under test without placing it in a sphere. In this case, the term "center" is meant to refer to the point of the retroreflector about which the first beam of light reflects symmetrically, even if it does not refer to a center of any object. The tracking system of the laser tracker may keep a portion of the reflected light centered on a position detector within the laser tracker, the position detector being, for example, a position sensitive detector or a photosensitive array. The laser tracker includes a first camera, which in an embodiment is mounted on an exterior surface of a payload of a tracker, the payload capable of rotation about the first axis and a second axis. In other embodiments, the first camera may be located inside the laser tracker and may view a scene external to the laser tracker, the scene centered about an optical axis of the laser tracker. In other embodiments the first camera may be located at other positions relative on or within the laser tracker. The first camera includes a first lens and a first photosensitive array. The first lens produces an image on the first photosensitive array of objects external to the laser tracker. A second light source, which in most cases is proximate to the first camera, emits a second beam of light. This light travels to retroreflector targets, which are a part of a collection of retroreflector targets. A portion of the second beam of light reflects off the retroreflectors and returns to the first camera, which images the reflected light on the first photosensitive array. A processor may be located in the laser tracker, in a companion electrical unit 50, in an external unit 60, or in a combination of locations. The processor may include a combination of processing elements including microprocessors, digital processing units, field programmable gate arrays, and memories. The processor is configured to operate the laser tracker.

Step 710 is to store a list of nominal coordinates for the first target, the second target, the third target, and at least one additional point. The nominal coordinates are three-dimensional coordinates given in a second frame of reference. The second frame of reference is associated with an object under test or with a structure to which the object under test is attached. An examples of a second frame of reference 40 is shown in FIGS. 1, 5, and 6. In general, the x, y, and z axes of the second frame of reference may be rotated with respect to the x, y, and z axes of the first frame of reference.

Step 715 is to capture on the first photosensitive array a portion of the light emitted by the second light beam and reflected off the first target, the second target, and the third target.

Step 720 is to obtain spot positions on the photosensitive array from the portion of light reflected off the first target, the second target, and the third target. The spot positions may, for example, be centroids of the spots for the first target, the second target, and the third target.

Step 725 is to determine a correspondence between a first spot position, a second spot position, and a third spot position on the first photosensitive array and the nominal coordinates of the first target, the second target, and the third target, respectively. Such a correspondence may be obtained in a variety of ways, for example, according to the methods of described in the claims herein below. One such method includes observing the possible correspondences within an allowable range of orientations of the second frame of reference with the first frame of reference. Another method involves using a triangulation method with two (stereo) cameras located on the laser tracker. Another method involves using a single tracker camera but rotating the tracker to two different orientations. With this method, the two images obtained on the camera photosensitive array are used to determine the correspondence. Measurements can also be made with the first camera in frontsight and backsight modes and the images obtained on the first photosensitive array used to determine the correspondence. The relative positions of first and second frames of reference may be changed, and the resulting pattern of spots on the first photosensitive array used to determine the correspondence. For example, the second frame of reference may be associated with a moving carriage, as shown in FIGS. 5 and 6, so that the first camera can obtain two different images as at different relative positions of the first and second frames of reference. In an embodiment, a general mathematical approach that may be undertaken to determine a correspondence between the first, second, and third spots on a photosensitive array and the nominal coordinates of first, second, and third targets involves constructing a transformation matrix to transform coordinates from frame of reference 2 to frame of reference 1 or vice versa, as discussed hereinabove and in the claims herein below. For an image obtained by a photosensitive array, the points on the array, may be projected from a location on the photosensitive array, through a perspective center of the lens, and into object space. In this way, the spots on a first photosensitive array may be converted into angles. If a second photosensitive array is available, with a known distance between the first and second photosensitive arrays, a triangulation procedure may be used to determine the position of each of the three targets, by methods that are well known to those skilled in the art. If only a single camera is available, a triangulation method may still be applied by obtaining frontsight and backsight images since the position of the camera is reversed to the opposite side of the tracker optical axis in going from frontsight to backsight modes. The distance between the camera positions in frontsight and backsight modes is known, so that the procedure is equivalent to a stereo triangulation procedure. Similarly, but rotating the tracker structure to two different angles (about the first axis, the second axis, or both), two different views can be obtained, and a method similar to a triangulation procedure may be used, as explained hereinabove and in '033. The method of constraints, in which the approximate relative orientations between the first and second frames of reference are known does not in general permit a direct solution for each of the three-dimensional coordinates of the first, second, and third targets, but in most cases it enables to positions to be localized well enough to draw a correspondence between the three spots and the nominal coordinates of the first, second, and third targets.

Step 730 is to direct the first beam of light to the first target based at least in part on the nominal coordinates of the first target and the first spot position and to measure the three-dimensional coordinates of the first target using the absolute distance meter, the first angular transducer, and the second angular transducer. As explained in step 720, some of the methods of obtaining correspondences yield three-dimensional coordinates with respect to the first frame of reference so that directing the laser beam to the first, second, and third targets is straightforward. In the case in which the directions are based on the constraints between the first and second frames of reference, the optimal directions to the first, second, and third targets may not be known to high precision; however, a direction can be obtained by assuming a distance to the target. The resulting direction is generally close enough to the optimal direction to enable the target to be captured, for example, by means of the methods describe in claims herein below. The measured three-dimensional coordinates are in the first frame of reference, which is the frame of reference of the laser tracker.

Step 735 is the same as step 730, only applied to the second target rather than the first target. Step 740 is the same as step 735, only applied to the third target rather than the first target.

Step 745 is to determine three-dimensional coordinates of the at least one additional point in the first frame of reference based at least in part on the measured three-dimensional coordinates of the first target, the second target, the third target, and the nominal coordinates of the at least one additional point. This is a mathematical step, which may be carried out, for example, by obtaining a transformation matrix that enables calculation of any nominal coordinate (three dimensional coordinate within the second frame of reference) into a three-dimensional coordinate within the first (tracker) frame of reference. The three-dimensional coordinates obtained in steps 725, 730, and 735 are sufficient to determine the transformation matrix, using methods that are well known to those skilled in the art.

Step 750 is to store the three-dimensional coordinates of the at least one additional point. The coordinates may be stored in electronic readable media, in a computer memory, or in a microprocessor, for example. Step 755 is the end of the method having the steps 700.

Figure 8:
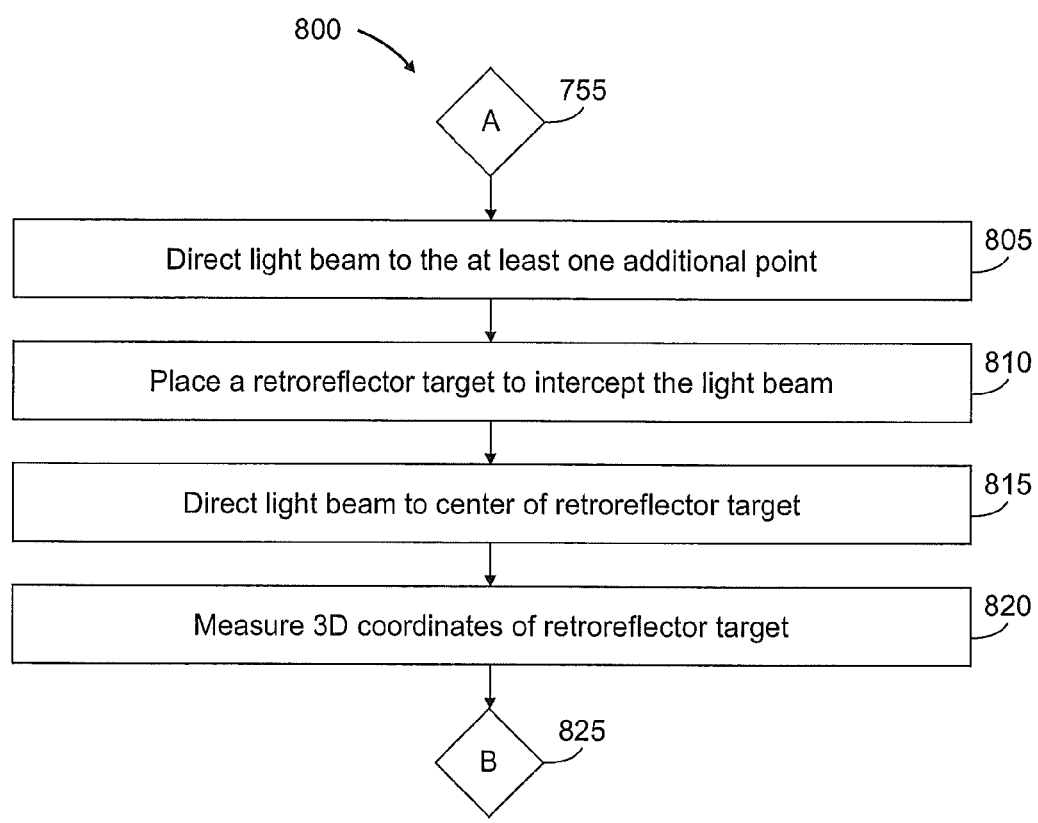
FIG. 8 is a flow diagram showing steps in measuring with a system according to an embodiment.

FIG. 8 is a flow diagram showing steps 800 in an embodiment for measuring with a system. The steps of 800 follow at point A, labeled 755, in FIG. 7. Step 805 is to direct a light beam to the at least one additional point. The laser tracker may carry out this step automatically.

Step 810 is to place a selected retroreflector target to intercept the first light beam. One way to do this is for the operator to move a handheld selected retroreflector target into the first beam of light. A second way to do this is to place the selected retroreflector target on a nest, for example, a magnetic nest, mounted on an object under test. If the three-dimensional coordinates of the at least one additional point is the known accurately enough, the first laser beam will be directed well enough that at least a portion of the beam will be captured by the clear aperture of the selected retroreflector target.

Step 815 is to direct the first light beam to the center of the selected retroreflector target. This step is performed by the tracking system of the laser tracker. Step 820 is to measure three-dimensional coordinates of the selected retroreflector target using the absolute distance meter, the first angular transducer, and the second angular transducer. The method 800 ends with step 825.

Figure 9:
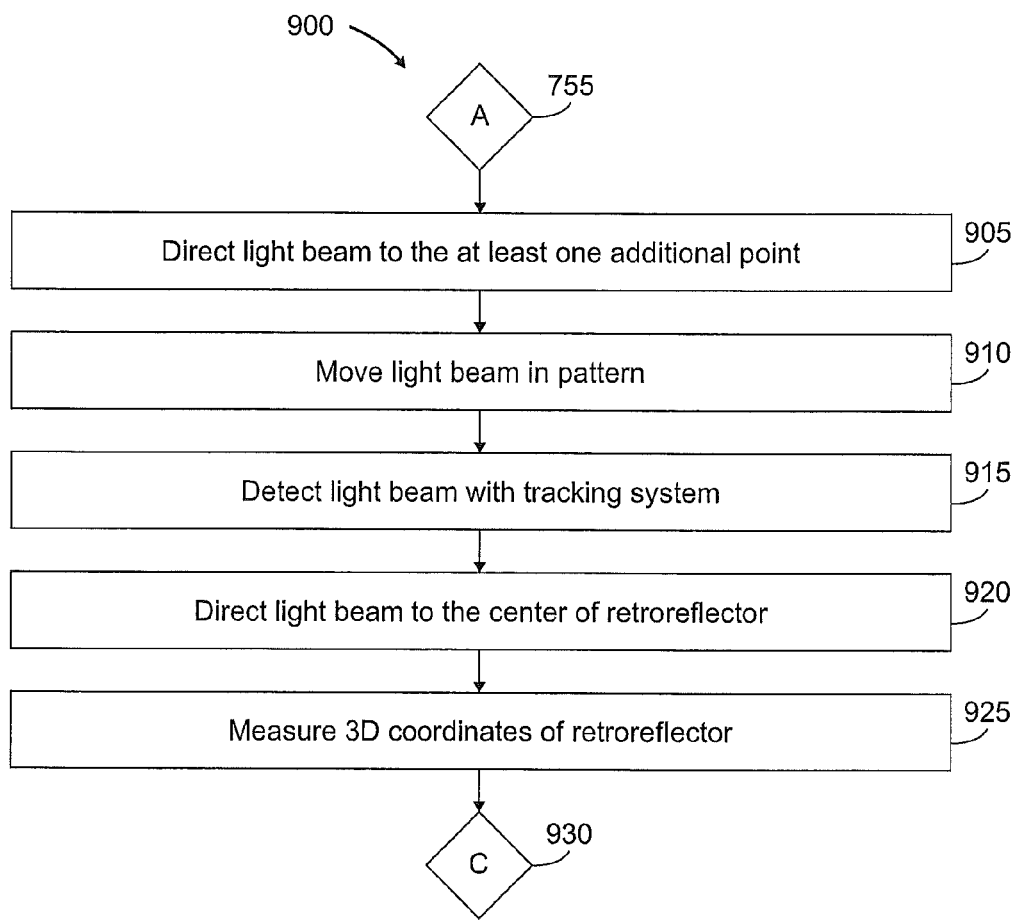
FIG. 9 is a flow diagram showing steps in measuring with a system according to an embodiment.

FIG. 9 is a flow diagram showing steps 900 in an embodiment for measuring with a system. The steps of 900 follow at a point A, labeled 755, in FIG. 7. Step 905 is to direct the first light beam to the at least one additional point.

The step 910 is to move the first light beam in a first pattern in space, the first pattern proximate to the at least one additional point. Such a first pattern is usually referred to as a search pattern. As an example, the light beam may begin at an initial position and then move in a spiral pattern outward.

Step 915 is to detect the light beam with the tracking system of the laser tracker. This may occur when a portion of the first beam of light reflected off a retroreflector strikes a position detector. This detecting of light by the position detector indicates that the first light beam has intercepted the clear aperture of the retroreflector target.

Step 920 is to direct the first light beam to a center of the selected retroreflector target. As explained above, the center in this context refers to a position relative to the retroreflector target about which light beams reflect symmetrically. The term center in this context does not necessarily refer to a physical center of the retroreflector target.

Step 925 is to measure three-dimensional coordinates of the selected retroreflector target using the absolute distance meter, the first angular transducer, and the second angular transducer. The method of step 900 ends with step 930.

Figure 10:
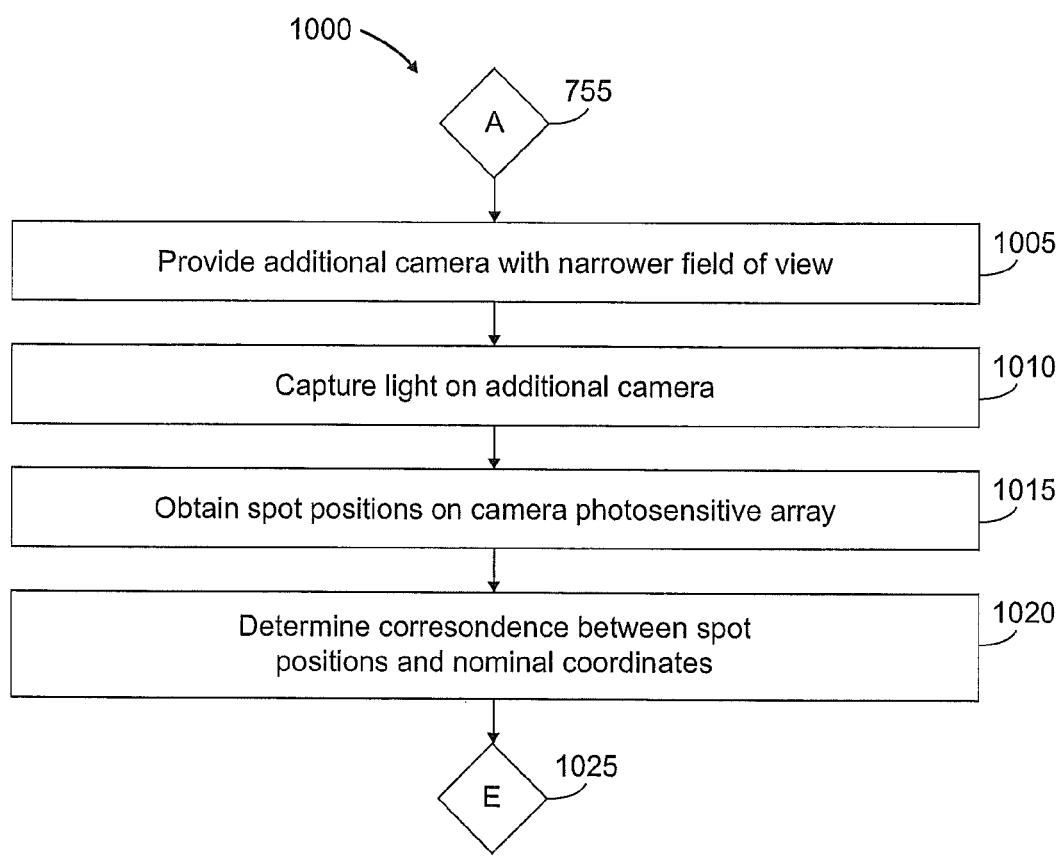
FIG. 10 is a flow diagram showing steps in measuring with a system according to an embodiment.

FIG. 10 is a flow diagram showing steps 1000 in an embodiment for measuring with a system. The steps of 1000 follow at a point A, labeled 755, in FIG. 7. Step 1005 is to provide a third camera and a fourth light source, the third camera including a third lens system and a third photosensitive array, the third camera having a field of view smaller than the field of view of the first camera, the fourth light source providing a fourth light beam.

Step 1010 is to capture on the third photosensitive array a portion of the light emitted by the fourth light source and reflected off the first target, the second target, and the third target. Images of the first target, the second target and the third target were already obtained with the first camera. Now additional measurements are collected using a third camera. In some cases, the information obtained from the first camera may be used to steer the laser tracker to a position enabling the second camera to view the first, second, or third target.

Step 1015 is to obtain spot positions on the photosensitive array from the portion of light reflected off each of the first target, second target, and the third target. Such spot positions may be obtained, for example, as centroids of each of the spots.

Step 1020 is to determine a correspondence between a first spot position, a second spot position, and a third spot position on the third photosensitive array and the nominal coordinates of the first target, the second target, and the third target, respectively. The methods for determining a correspondence are the same as those discussed herein above, but relatively more accurate information provided by the third camera, which has a narrower field of view than the first camera. The method 1000 ends with step 1025.

Figure 11:
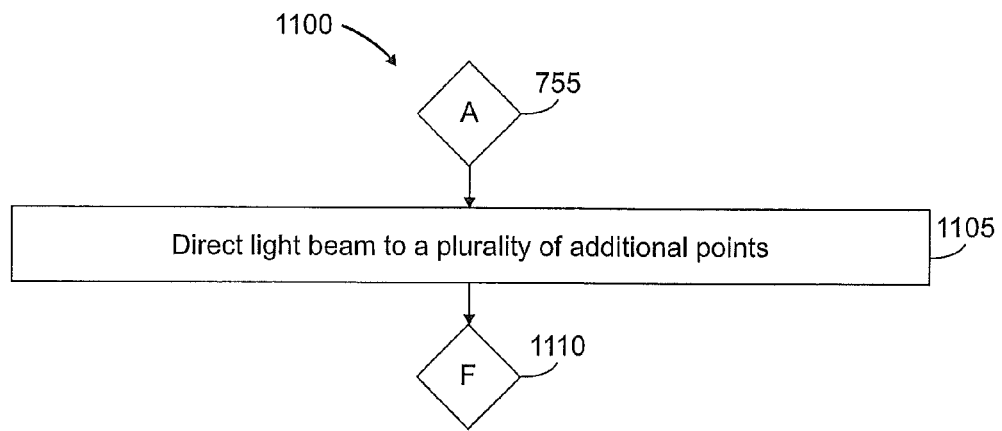
FIG. 11 is a flow diagram showing steps in measuring with a system according to an embodiment.

FIG. 11 is a flow diagram showing steps 1100 in an embodiment for measuring with a system. The steps of 1100 follow at a point A, labeled 755, in FIG. 7. Steps 1105 is to direct the first light beam to a plurality of additional points, the plurality of additional points including the first additional point, the plurality of additional points indicative of actions to be taken by an operator. In this way, the laser tracker is able to direct the action of an operator.

Figure 12:
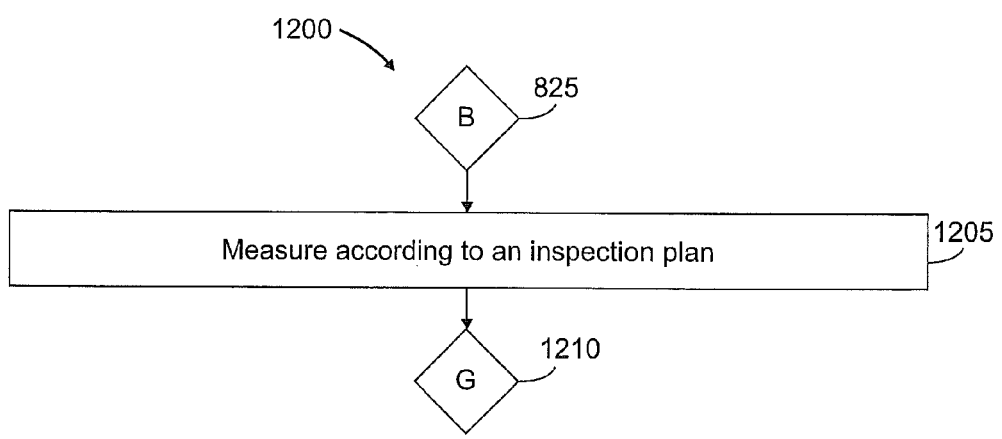
FIG. 12 is a flow diagram showing steps in measuring with a system according to an embodiment.

FIG. 12 is a flow diagram showing steps 1200 in an embodiment for measuring with a system. The steps of 1200 follow at a point B, labeled 825, in FIG. 8. Step 1205 is to measure according to an inspection plan. A typical inspection plan may include a variety of points that are to be measured. Some of the points may be on the surface of an object, while other points may be in nests. Some of the points may be measured discretely, while other points are measured in a scan pattern over designated surfaces.

Figure 13:
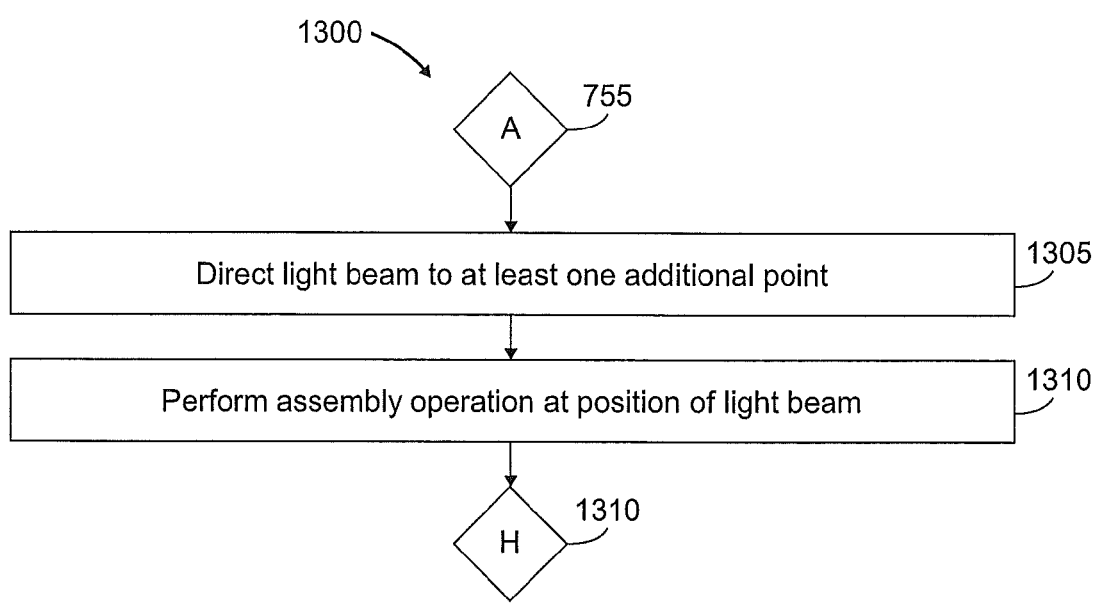
FIG. 13 is a flow diagram showing steps in measuring with a system according to an embodiment.

FIG. 13 is a flow diagram showing steps 1300 in an embodiment for measuring with a system. The steps of 1300 follow at a point A, labeled 755, in FIG. 7. Step 1305 is to direct the first light beam to the at least one additional point. Step 1310 is to perform an assembly operation at a position of the first light beam. An assembly operation may include drilling screwing, sanding, puttying, milling, or any other operation intended to modify the object or add to the object. For example, the first light beam might indicate a location on the object for which a hole is to be drilled.

Figure 14:
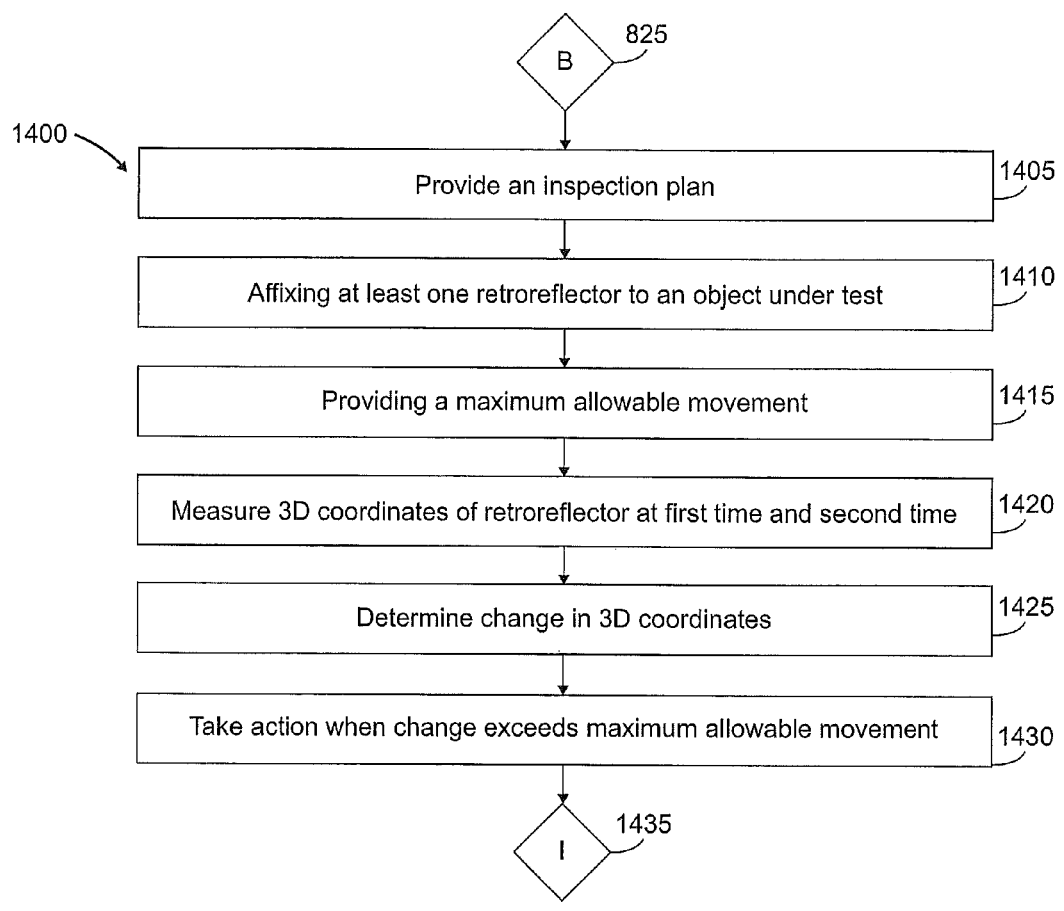
FIG. 14 is a flow diagram showing steps in measuring with a system according to an embodiment.

FIG. 14 is a flow diagram showing steps 1400 in an embodiment for measuring with a system. The steps of 1400 follow at a point B, labeled 825, in FIG. 8. Step 1405 is to provide an inspection plan having inspection points to be measured by the laser tracker. Step 1410 is to affix at least one retroreflector target to an object under test. Such a retroreflector target serves in effect as a drift monument enabling a stability check of the system. Step 1415 is to provide a maximum allowable movement for the three-dimensional coordinates of the at least one retroreflector target affixed to the object under test. The maximum allowable movement is a numerical value provided by the user based on the required stability. The step 1020 is to measure the three-dimensional coordinates of the at least one retroreflector target affixed to the object under test, the measuring performed at a first time and at a second time. The step 1025 is to determine a first change in the three-dimensional coordinates of the at least one retroreflector target from the first time to the second time. In a highly stable system, these coordinates will change by a small amount. If either the object under test or the laser tracker is bumped, the measurements can suddenly change, thereby introducing errors. Similarly, if the temperature of the environment changes significantly, the dimensions of the object may change, the performance of the tracker may degrade, or the properties of the air through which the first light beam propagates may change. Any of these changes may degrade the accuracy of measurements. The step 1030 is to take an action when the first change exceeds the maximum allowable movement. The action may include measuring at least three retroreflectors on the object under test to re-establish the three-dimensional coordinates of the inspection points. It may also include notifying an operator that the first change has exceeded the maximum allowable movement. This might prompt the operator to re-compensate the laser tracker, check the stability of the object under test and the laser tracker, or take other steps. The method 1400 ends at step 1435.

Figure 15:
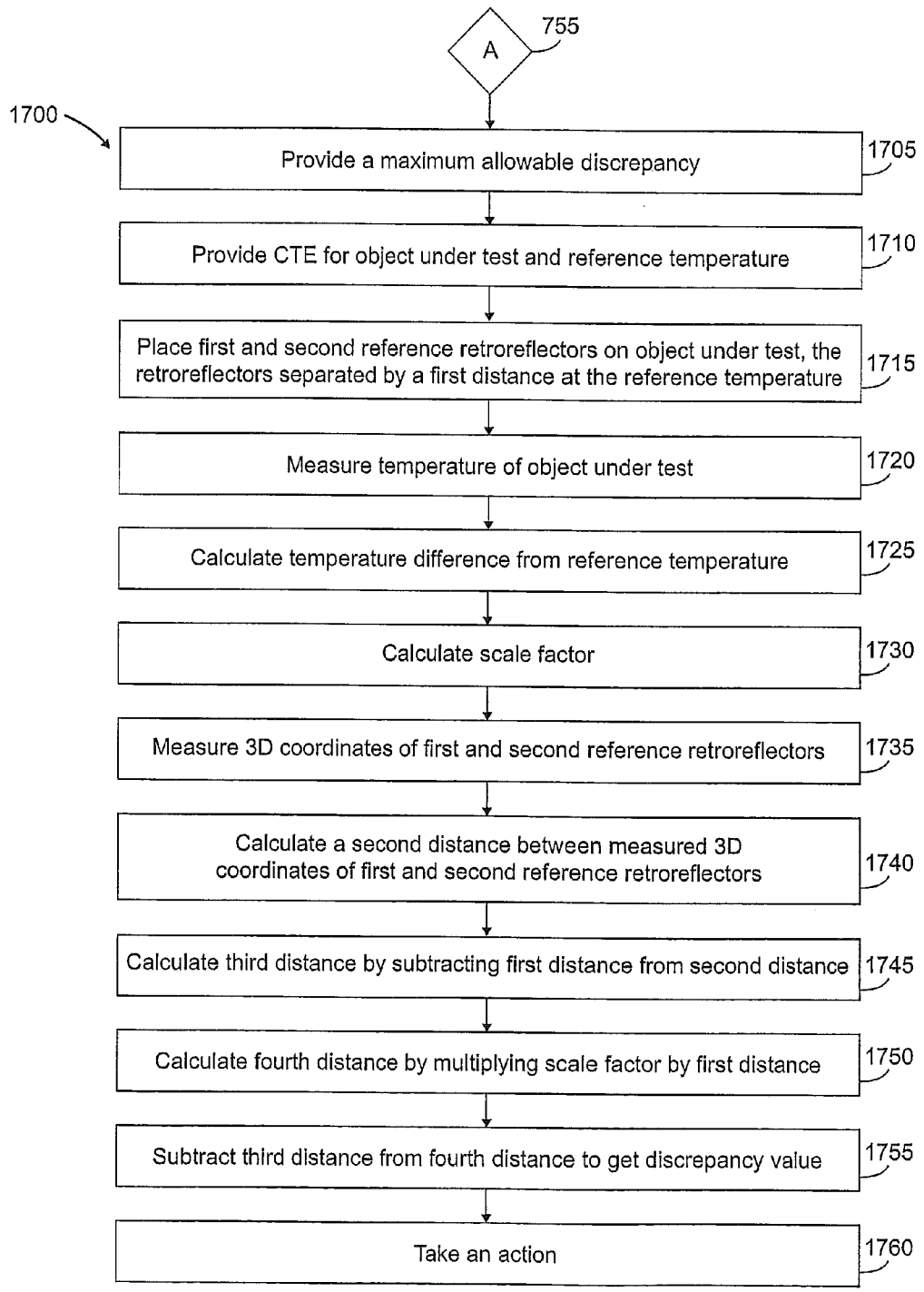
FIG. 15 is a flow diagram showing steps in measuring with a system according to an embodiment.

FIG. 15 is a flow diagram showing steps 1700 in an embodiment for measuring with a system. The steps of 1700 follow at a point A, labeled 755, in FIG. 7. Step 1705 is to provide a maximum allowable discrepancy. This is a value provided by the user. Step 1710 is to provide a coefficient of thermal expansion (CTE) for the object under test and a reference temperature. As an example, if the material is steel, a CTE of 11.5 micrometers/meter/° C. may be provided. The reference temperature might be the widely used value of 20° C. Step 1715 is to place a first reference retroreflector and a second reference retroreflector on the object under test, there being a first distance between the first reference retroreflector and the second reference retroreflector at the reference temperature. Step 1720 is to measure a temperature of the object under test. Step 1725 is to calculate a first temperature difference by subtracting the reference temperature from the measured temperature of the object under test. Step 1730 is to calculate a scale factor by multiplying the first temperature difference by the coefficient of thermal expansion. This gives a value in units of micrometers/meter, for example. In other words, the scale factor is a dimensionless quantity. Step 1735 is to measure the 3D coordinates of the first and second reference retroreflectors using the absolute distance meter, the first angular transducer, and the second angular transducer. Step 1740 is to calculate a second distance extending from the measured 3D coordinates of the first reference retroreflector to the measured 3D coordinates of the second reference retroreflector. Step 1745 is to calculate a third distance by subtracting the first distance from the second distance. Step 1750 is to calculate a fourth distance by multiplying the first distance by the scale factor. Step 1755 is to calculate a discrepancy value by subtracting the third distance from the fourth distance. Step 1760 is to take an action when the discrepancy value exceeds the maximum allowable discrepancy, the action being either issuing an alarm or measuring coordinates from among at least some retroreflector targets from among the collection of retroreflector targets and, from this data, re-establishing a frame of reference for an object. The purpose of the steps 1700 is to check the consistency of thermal length compensations to directly measured length differences. If the changes in length do not match, there is the chance that the temperature measurement is not valid, the CTE value is not given correctly, or there is some other problem. With this problem identifies, additional steps can be taken.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, C# or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Any flowcharts and block diagrams in the FIGURES illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While preferred embodiments have been shown and described, various modifications and substitutions may be made thereto without departing from the spirit and scope of the invention. Accordingly, it is to be understood that the present invention has been described by way of illustrations and not limitation.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for measuring with a system, the method comprising steps of:

providing the system including a collection of retroreflector targets and a laser tracker, the collection of retroreflector targets including at least two retroreflector targets configured to be placed on an object, the at least two retroreflector targets including a first target, and a second target, the laser tracker in a first frame of reference fixed with respect to a laser tracker surroundings, the laser tracker having a first inclinometer, a structure, a first light source, an absolute distance meter, a first angular transducer, a second angular transducer, a tracking system, a first camera, a second light source, a processor, and a memory, the memory operably coupled to the processor, the first inclinometer configured to measure a first angle of tilt and a second angle of tilt of the first frame of reference with respect to a gravity vector, the structure rotatable about a first axis and a second axis, the first light source producing a first light beam that cooperates with the absolute distance meter, the first angular transducer measuring a first angle of rotation about the first axis, the second angular transducer measuring a second angle of rotation about the second axis, the tracking system configured to move the first light beam to a center of any retroreflector target from among the collection of retroreflector targets, the first camera including a first lens system and a first photosensitive array, the second light source providing a second light beam, and the processor configured to operate the laser tracker;

storing, with the processor into the memory, a list of nominal coordinates for the first target, the second target, and at least one additional point, a nominal coordinates being three-dimensional coordinates in a second frame of reference;

measuring with a second inclinometer a third angle of tilt and a fourth angle of tilt of the second frame of reference with respect to the gravity vector;

capturing on the first photosensitive array a portion of the second light beam reflected off the first target and the second target;

determining by the processor a first spot position and a second spot position on the first photosensitive array from the portion of the second light beam reflected off the first target and the second target;

determining by the processor a correspondence between the first spot position and the second spot position, and the stored nominal coordinates of the first target and the second target, respectively;

directing by the processor the first light beam to the first target based at least in part on the stored nominal coordinates of the first target, the first spot position, the first angle of tilt, the second angle of tilt, the third angle of tilt, and the fourth angle of tilt;

measuring three-dimensional coordinates of the first target using the absolute distance meter, the first angular transducer, and the second angular transducer;

directing by the processor the first light beam to the second target based at least in part on the stored nominal coordinates of the second target, the second spot position, the first angle of tilt, the second angle of tilt, the third angle of tilt, and the fourth angle of tilt;

measuring three-dimensional coordinates of the second target using the absolute distance meter, the first angular transducer, and the second angular transducer;

directing by the processor the first light beam to a plurality of additional points, the plurality of additional points including the at least one additional point, the plurality of additional points indicative of actions to be taken by an operator;

determining by the processor three-dimensional coordinates of the at least one additional point in the first frame of reference based at least in part on the measured three-dimensional coordinates of the first target, the measured three-dimensional coordinates of the second target, the stored nominal coordinates of the at least one additional point, the first angle of tilt, the second angle of tilt, the third angle of tilt, and the fourth angle of tilt; and storing, with the processor into the memory, the determined three-dimensional coordinates of the at least one additional point.

2. The method of claim 1, further including steps of:

acting by the operator in response to the first light beam being directed to the at least one additional point by placing a selected retroreflector target to intercept at least a portion of the first light beam, the selected retroreflector target selected from among any of the retroreflector targets in the collection of retroreflector targets;

directing by the processor the first light beam to a center of the selected retroreflector target; and measuring three-dimensional coordinates of the selected retroreflector target using the absolute distance meter, the first angular transducer, and the second angular transducer.

3. The method of claim 2, wherein the step of placing the selected retroreflector target to intercept at least a portion of the first light beam includes one step selected from the group consisting of:

moving the selected retroreflector target to intercept at least a portion of the first light beam; and placing the selected retroreflector target in a fixed nest positioned to intercept at least a portion of the first light beam.

4. The method of claim 2, further including a step of measuring according to an inspection plan.

5. The method of claim 4, wherein the step of measuring according to the inspection plan further includes a step of measuring automatically without an operator intervention.

6. The method of claim 4, wherein the step of measuring according to the inspection plan further includes a step of moving the first light beam to direct the operator to move the selected retroreflector target to measure according to the inspection plan.

7. The method of claim 4, wherein the step of measuring according to the inspection plan further includes detecting when the operator has placed the selected retroreflector target in a wrong location and directing the operator to move the selected retroreflector target to a correct location, the laser tracker moving the first light beam to indicate to the operator the correct location of the selected retroreflector target.

8. The method of claim 4, wherein the step of measuring according to the inspection plan includes steps of:
obtaining nominal coordinates of a target point, the nominal coordinates derived from data provided in a computer aided design (CAD), the CAD data transformed into the first frame of reference;
providing the selected retroreflector target as a spherically mounted retroreflector, the spherically mounted retroreflector having a cube-corner retroreflector embedded within a spherical surface, the spherical surface having a first radius;
placing the selected retroreflector target at the position of the target point, the retroreflector target either held against the target point or placed on a magnetic nest representing the target point;
measuring three-dimensional coordinates of the selected retroreflector target using the absolute distance meter, the first angular transducer, and the second angular transducer;
calculating three-dimensional coordinates of the measured target point based at least in part on the measured three-dimensional coordinates of the selected retroreflector target and on the first radius;
calculating a first difference in three-dimensional coordinates of the measured target point and the nominal coordinates of the target point; and
providing an indication of a first difference.

9. The method of claim 8, wherein the step of providing an indication of the first difference includes providing a warning if the first difference exceeds a first allowable difference.

10. The method of claim 4, wherein the step of measuring according to the inspection plan includes steps of performing a two-face test to obtain a two-face error and providing a warning if the two face error exceeds a maximum allowable two-face error value.

11. The method of claim 4, wherein the step of measuring according to the inspection plan includes steps of measuring three-dimensional coordinates of two target points and providing a warning if relative positions of the two target points exceed a maximum allowable target change value.

12. The method of claim 2, further including steps of:
providing an inspection plan having inspection points to be measured by the laser tracker;
affixing at least one retroreflector target to the object under test;
providing a maximum allowable movement of at least one of the at least two retroreflector targets affixed to the object under test;
measuring three-dimensional coordinates of at least one of the at least two retroreflector targets affixed to the object under test, the measuring performed at a first time and at a second time;
determining a first change in the three-dimensional coordinates of at least one of the at least two retroreflector targets from the first time to the second time; and
taking an action when the first change exceeds the maximum allowable movement, the action being one of:
measuring at least three retroreflector targets from the collection of retroreflector targets on the object under test to re-establish three-dimensional coordinates of the inspection points, and
notifying the operator that the first change has exceeded the maximum allowable movement.

13. The method of claim 1, further including steps of:
moving by the processor the first light beam in a first pattern in space, the first pattern proximate to the at least one additional point;
detecting by the tracking system a reflection of the first light beam by a selected retroreflector target, the selected retroreflector target selected from among any of the retroreflector targets in the collection of retroreflector targets;
directing by the processor the first light beam to a center of the selected retroreflector target; and
measuring three-dimensional coordinates of the selected retroreflector target using the absolute distance meter, the first angular transducer, and the second angular transducer.

14. The method of claim 1, further including the steps of:
providing the laser tracker with a second camera and a third light source, the second camera including a second lens system and a second photosensitive array, the second camera having a second field of view smaller than a first field of view of the first camera, the third light source providing a third light beam;
capturing on the second photosensitive array a portion of the third light beam reflected off the first target, and the second target;
determining by the processor a third spot position and a fourth spot position on the second photosensitive array from the third light beam reflected off the first target and the second target; and
determining by the processor a correspondence between the third spot position and the fourth spot position, and the stored nominal coordinates of the first target and the second target, respectively.

15. The method of claim 1, wherein the step of capturing on the first photosensitive array a portion of the second light beam reflected off the first target and the second target further includes one step selected from the group consisting of:
positioning the laser tracker on a stand so that the first photosensitive array simultaneously obtains the first spot position and the second spot position;
rotating the first camera and the second light source about the first axis to a plurality of orientations so that the first photosensitive array obtains the first spot position at a first of the plurality of orientations and the second spot position at a second of the plurality of orientations; and
moving a selected retroreflector target from among the collection of retroreflector targets to delimit a region of space that contains the first target, and the second target, the region of space determined by the laser tracker either by tracking the selected retroreflector target by the tracking system or by tracking movement of the selected retroreflector target on the first photosensitive array.

16. The method of claim 1, wherein the step of providing the system further includes providing the tracker with a third camera and a fourth light source, the third camera including a third lens system and a third photosensitive array, the fourth light source providing a fourth light beam, the processor further configured to calculate three-dimensional coordinates of any retroreflector targets from among the collection of retroreflector targets, the calculated three-dimensional coordinates based at least in part on first images on the first photosensitive array and on third images on the third photosensitive array, the first images and the third images obtained in response to the second light beam and the fourth light beam reflected by the any retroreflector targets.

17. The method of claim 1, wherein the step of determining by the processor a correspondence between the first spot position and the second spot position and the stored nominal coordinates of the first target and the second target, includes one step selected from the group consisting of:
determining the correspondence based at least in part on a range of allowable relative orientations between the first frame of reference and the second frame of reference and on the nominal coordinates of the first target, and the second target;
collecting, at a first time, a first set of images from the first photosensitive array in response to illumination of the first target and the second target by the second light beam; changing one of the first angle of rotation and the second angle of rotation and collecting, at a second time, a second set of images from the first photosensitive array in response to illumination of the first target and the second target by the second light beam; and determining the correspondence among the first spot position and the second spot position and the nominal coordinates of the first target, and the second target, the determining based at least in part on the first set of images and the second set of images; and
collecting, at a third time, a third set of images from the first photosensitive array in response to illumination of the first target and the second target by the second light beam; changing the position of the second frame of reference relative to the first frame of reference and collecting, at a fourth time, a fourth set of images from the first photosensitive array in response to illumination of the first target and the second target by the second light beam; and determining the correspondence among the first spot position, the second spot position and the nominal coordinates of the first target, and the second target, the determining based at least in part on the third set of images and the fourth set of images.

18. The method of claim 1, wherein the step of storing the list of nominal coordinates for the first target, the second target, and the at least one additional point, further includes one step selected from the group consisting of:
extracting the nominal coordinates from a computer aided design (CAD) model; and
measuring the nominal coordinates with a 3D measurement instrument.

19. The method of claim 1, further comprising an action taken by the operator selected from the group consisting of:
picking up a selected retroreflector target, designated by the plurality of additional points;
moving the selected retroreflector target in a direction indicated by the plurality of additional points, capturing the first light beam with the selected retroreflector target, and measuring three dimensional coordinates of the at least one additional point using the absolute distance meter, the first angular transducer, and the second angular transducer;
observing a pattern formed by the plurality of additional points, capturing the first light beam with the selected retroreflector target, and measuring three-dimensional points along the pattern; and
observing a pattern formed by the plurality of additional points, interpreting the points as a gestural command, and taking action as indicated by the gestural command.

20. The method of claim 1, wherein the step of determining three-dimensional coordinates of the at least one additional point further includes steps of:
calculating a transformation matrix to transform arbitrary three-dimensional coordinates in the second frame of reference to arbitrary three-dimensional coordinates in the first frame of reference, the calculating based at least in part on the nominal coordinates of the first target, and the second target; and
calculating three-dimensional coordinates of the at least one additional point based at least in part on the transformation matrix and the nominal coordinates of the at least one additional point.

21. The method of claim 1, wherein the step of providing the system includes providing at least one of the retroreflector targets from among the collection of retroreflector targets with a cube-corner retroreflector, the cube-corner retroreflector having three reflecting surfaces that are mutually perpendicular.

22. The method of claim 1, wherein the step of providing the system includes providing at least one of the retroreflector targets from among the collection of retroreflector targets as a spherically mounted retroreflector, the spherically mounted retroreflector having a cube-corner retroreflector embedded within a spherical surface.

23. The method of claim 1, wherein the step of providing the system includes providing at least one retroreflector target from among the collection of retroreflector targets as a reflective point centered within a spherical surface.

24. The method of claim 1, further including steps of:
directing the first light beam to the at least one additional point; and
performing an assembly operation at a position of the first light beam.

25. The method of claim 24, wherein the step of performing the assembly operation includes drilling a hole in the object at the position of the first light beam.

26. The method of claim 1, further including steps of:
providing a maximum allowable discrepancy;
providing a coefficient of thermal expansion for the object under test;
providing a reference temperature;
placing a first reference retroreflector and a second reference retroreflector on the object under test, there being a first distance between the first reference retroreflector and the second reference retroreflector at the reference temperature;
measuring a temperature of the object under test;
calculating a first temperature difference by subtracting the reference temperature from the measured temperature of the object under test;
calculating a scale factor by multiplying the first temperature difference by the coefficient of thermal expansion;
measuring three-dimensional coordinates of the first reference retroreflector using the absolute distance meter, the first angular transducer, and the second angular transducer;
measuring three-dimensional coordinates of the second reference retroreflector using the absolute distance meter, the first angular transducer, and the second angular transducer;
calculating a second distance extending from the measured three-dimensional coordinates of the first reference retroreflector to the measured three-dimensional coordinates of the second reference retroreflector;
calculating a third distance by subtracting the first distance from the second distance;

calculating a fourth distance by multiplying the scale factor by the first distance;
calculating a discrepancy value by subtracting the third distance from the fourth distance; and
taking an action when the discrepancy value exceeds the maximum allowable discrepancy, the action being either issuing an alarm or measuring three-dimensional coordinates of at least some retroreflector targets from among the collection of retroreflector targets and, re-establishing a frame of reference for the object under test.

* * * * *